(12) United States Patent
Smith et al.

(10) Patent No.: US 9,047,856 B2
(45) Date of Patent: Jun. 2, 2015

(54) METHOD AND APPARATUS FOR TONE DETECTION

(75) Inventors: Kenneth W. D. Smith, London (GB); Jaques de Broin, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/559,354

(22) Filed: Jul. 26, 2012

(65) Prior Publication Data

US 2014/0029733 A1 Jan. 30, 2014

(51) Int. Cl.
*H04M 1/64* (2006.01)
*H04M 3/493* (2006.01)
*G10L 25/78* (2013.01)
*G10L 15/00* (2013.01)

(52) U.S. Cl.
CPC ............ *G10L 15/00* (2013.01); *H04M 3/493* (2013.01); *G10L 25/78* (2013.01)

(58) Field of Classification Search
CPC ............ H04M 2201/42; H04M 2201/50; H04M 3/563; H04M 3/566; H04M 3/567
USPC ............ 379/22.02, 24, 93.09, 390.01, 406.1; 704/231
See application file for complete search history.

(56) References Cited

U.S. PATENT DOCUMENTS

| | | | | |
|---|---|---|---|---|
| 7,466,810 B1 * | 12/2008 | Quon et al. | ............ | 379/201.01 |
| 7,844,048 B2 * | 11/2010 | Pessoa et al. | ............ | 379/386 |
| 2003/0123647 A1 * | 7/2003 | Itoh | ............ | 379/399.01 |
| 2003/0174202 A1 * | 9/2003 | Eshkoli et al. | ............ | 348/14.08 |
| 2010/0189249 A1 * | 7/2010 | Shah et al. | ............ | 379/265.09 |
| 2011/0216888 A1 * | 9/2011 | Bhasin et al. | ............ | 379/88.01 |
| 2012/0230254 A1 * | 9/2012 | Otamendi et al. | ............ | 370/328 |
| 2013/0120522 A1 * | 5/2013 | Lian et al. | ............ | 348/14.08 |

OTHER PUBLICATIONS http://docs.voxeo.com/ccxml/1.0-final/frame.jsp?page=ansdetection_ccxml10.htm, downloaded Aug. 31, 2012.

* cited by examiner

*Primary Examiner* — Fan Tsang
*Assistant Examiner* — Solomon Bezuayehu
(74) *Attorney, Agent, or Firm* — Hamilton, Brook, Smith & Reynolds, P.C.

(57) ABSTRACT

A speech server and methods provide audio stream analysis for tone detection in addition to speech recognition to implement an accurate and efficient answering machine detection strategy. By performing both tone detection and speech recognition in a single component, such as the speech server, the number of components for digital signal processing may be reduced. The speech server communicates tone events detected at the telephony level and enables voice applications to detect tone events consistently and provide consistent support and accuracy of both inbound and outbound voice applications independent of the hardware or geographical location of the telephony network. In addition, an improved opportunity for signaling of an appropriate moment for an application to leave a message is provided, thereby supporting automation.

20 Claims, 19 Drawing Sheets

```xml
<?xml version="1.0"?>
<telephony_tones THR_SIG="-45">
 <fax enable ="true" THR_TONE="-38" THR_REL="15"/>
 <tty enable ="true" THR_TONE="-38" THR_REL="15" THR_STEP="3" repeat="4"
   onmax="1600"/>
 <dtmf enable ="true" THR_TONE="-25" THR_REL="15" N=136 OV=16
   THR_TWISTSTD="8"  THR_TWISTREV="4"
   THR_ROWREL ="8"  THR_COLREL="8"
   THR_RHARM  ="4"  THR_CHARM="18"
 ONSET="3" RELEASE="5"
 />
 <amd enable = "false" terminal="true"
      TO_HUMAN="1500" TO_TRANS="2500" TO_MACHINE="8000"
TO_BEEP="16000" TO_NOSPCH="7000" TO_MAXSPCH="-1" TO_IGNORE="0"
SENS="0.7"
      INTERNAL_S="A0,5,15" INTERNAL_H="A0,1.8,4,2,240" THR_REL="-6"
THR_TONE="-40" BEEP_MINFREQ="359" BEEP_EARLIEST="1100"
      INTERNAL_B="A0,15,7,4,1,8"
 />
 <region enable="true">
  <seq_tone desc="ringback" N=236 terminal="false" suppress="true"
    THR_REL="15" THR_TONE="-42" THR_STEP="3" DEBOUNCE="4"
  >
   <tone freq1="440" freq2="480" on="300" onmax="2500"/>
  </seq_tone>

<seq_tone desc="sit.reorder.intralata" N=136 terminal="true"
    THR_REL="15" THR_TONE="-42" THR_STEP="3" DEBOUNCE="4"
  >
   <tone freq1="914"  on="220" onmax="320"/>
   <tone on="0" onmax="40"/>
   <tone freq1="1429" on="340" onmax="460"/>
   <tone on="0" onmax="40"/>
   <tone freq1="1777" on="340" onmax="460"/>
  </seq_tone>
  <seq_tone desc="sit.vacant" N=136 terminal="true"
    THR_REL="15" THR_TONE="-42" THR_STEP="3" DEBOUNCE="4"
  >
   <tone freq1="985"  on="340" onmax="460"/>
   <tone on="0" onmax="40"/>
   <tone freq1="1371" on="220" onmax="320"/>
   <tone on="0" onmax="40"/>
   <tone freq1="1777" on="340" onmax="460"/>
  </seq_tone>
  <seq_tone desc="sit.no.circuit.intralata" N=136 terminal="true"
    THR_REL="15" THR_TONE="-42" THR_STEP="3" DEBOUNCE="4"
```

FIG. 3B-1

```
>
  <tone freq1="985" on="340" onmax="460"/>
  <tone on="0" onmax="40"/>
  <tone freq1="1429" on="340" onmax="460"/>
  <tone on="0" onmax="40"/>
  <tone freq1="1777" on="340" onmax="460"/>
</seq_tone>
<seq_tone desc="sit.intercept" N=136 terminal="true"
  THR_REL="15" THR_TONE="-42" THR_STEP="3" DEBOUNCE="4"
>
  <tone freq1="914" on="220" onmax="320"/>
  <tone on="0" onmax="40"/>
  <tone freq1="1371" on="220" onmax="320"/>
  <tone on="0" onmax="40"/>
  <tone freq1="1777" on="340" onmax="460"/>
</seq_tone>
<seq_tone desc="sit.reorder.interlata" N=136 terminal="true"
  THR_REL="15" THR_TONE="-42" THR_STEP="3" DEBOUNCE="4"
>
  <tone freq1="985" on="220" onmax="320"/>
  <tone on="0" onmax="40"/>
  <tone freq1="1371" on="340" onmax="460"/>
  <tone on="0" onmax="40"/>
  <tone freq1="1777" on="340" onmax="460"/>
</seq_tone>
<seq_tone desc="sit.no.circuit.interlata" N=136 terminal="true"
  THR_REL="15" THR_TONE="-42" THR_STEP="3" DEBOUNCE="4"
>
  <tone freq1="914" on="340" onmax="460"/>
  <tone on="0" onmax="40"/>
  <tone freq1="1371" on="340" onmax="460"/>
  <tone on="0" onmax="40"/>
  <tone freq1="1777" on="340" onmax="460"/>
</seq_tone>
<seq_tone desc="sit.ineffective.other" N=136 terminal="true"
  THR_REL="15" THR_TONE="-42" THR_STEP="3" DEBOUNCE="4"
>
  <tone freq1="914" on="340" onmax="460"/>
  <tone on="0" onmax="40"/>
  <tone freq1="1429" on="220" onmax="320"/>
  <tone on="0" onmax="40"/>
  <tone freq1="1777" on="340" onmax="460"/>
</seq_tone>
<seq_tone desc="sit.future" N=136 terminal="true"
  THR_REL="15" THR_TONE="-42" THR_STEP="3" DEBOUNCE="4"
>
```

FIG. 3B-2

```
        <tone freq1="985" on="220" onmax="460"/>
        <tone on="0" onmax="40"/>
        <tone freq1="1429" on="235" onmax="460"/>
        <tone on="0" onmax="40"/>
        <tone freq1="1777" on="340" onmax="460"/>
      </seq_tone>
    </region>
</telephony_tones>
```

FIG. 3B-3

FIG. 8 DETECTION OF A SIT TONE ON AN UNANSWERED CALL

FIG. 10 DETAILS ON AN INBOUND CALL ESTABLISHMENT

METHOD AND APPARATUS FOR TONE DETECTION

BACKGROUND OF THE INVENTION

In a telephony network, tones may be generated at different places, depending on the switching technology and the nature, or purpose, of the tone. Most tone signals in use in the Public Switched Telephone Network (PSTN) are sequences of simple combinations of sine waves. There is no single international standard for all telephone tones. Third party vendors provide telephony equipment relied upon to detect telephony devices, and telephony tones. Such telephony equipment includes Voice-over-Internet Protocol (VOIP) gateways. A voice platform in a telephony network may interface with the gateway that detects the telephony devices and telephony tones.

In a voice platform, a telephony session service may be responsible for general call processing and interfaces with telephony gateways or telephony hardware boards. A speech server (e.g. voice server) may be responsible for media processing (e.g, speech recognition, playback). A recognizer may be responsible for recognition of speech and Dual-Tone Multi-Frequency (DTMF) grammars.

A voice browser may be responsible for processing Voice Extensible Markup Language (VoiceXML, or VXML) documents and for directing the operation of the speech server. VXML is a standard Extensible Markup Language (XML) format for specifying interactive voice dialogues between a human and a computer. VoiceXML documents are interpreted by a voice browser.

An application may submit instructions to be processed by the voice browser. Audio data received from the telephony network may be packetized and communicated via the Real-time Transport Protocol (RTP), between a telephony gateway and the speech server. In such an architecture, the normal circuit-switched trunk terminates at the gateway.

SUMMARY OF THE INVENTION

In accordance with some embodiments, a method comprises disambiguating speech from tones in an audio stream by a plurality of tone detection modules in a speech server. Disambiguating speech from tones may include performing an analysis on the audio stream received. The method may include detecting tones at the plurality of tone detection modules based on the analysis. The method may further include broadcasting tone events to at least one of the plurality of tone detection modules, and triggering a series of tone observation notifications. The series of tone observation notifications may be based on a series of tone events broadcast by separate tone detection modules. Broadcasting may be notifying one or more of the plurality of tone detection modules. Broadcasting may be notifying a module or set of modules that benefit from the knowledge of the tone event. Benefiting from the knowledge of the tone event may include influencing the behavior of the module. Broadcasting may be unicasting or any suitable form of notification. Alternatively, for purposes of simplicity broadcasting could be notifying.

Triggering the series of tone observation notifications by the speech server may include announcing detection of an Answering Machine Device (AMD) and announcing detection of an end of an AMD greeting message. The method may further include delaying announcing detection of the end of the AMD greeting message by the speech server by detecting an initial ringback tone event broadcast to indicate a potential onset of a ringback tone. The method may also include resetting the analysis on the audio stream received by detecting a ringback tone event broadcast.

The method may communicate tone observation notifications using Session Initiation Protocol (SIP) information messages containing a text payload describing one or more tone observations.

The plurality of tone detection modules may include a first subset and a second subset, the first subset being a set of universal tone detection modules and the second subset being a set of regional tone detection modules. The method may include extending a set of universal and regional tones being detected by updating an Extensible Markup Language (XML) document.

The method may further include detecting universal tones at the first subset of tone detection modules and regional tones at the second subset of tone detection modules. The universal tones may include Dual-Tone Multi-Frequency (DTMF) tones or Answering Machine Device (AMD) tones, and the regional tones may include Special Information Tones (SIT) or ringback tones.

Analysis on the audio stream received at the DTMF tone detector may include applying Linear Predictive Coding Residual analysis (LPC-R), Goertzel filters, or a Fast Fourier Transform. In addition, analysis on the audio stream received at the AMD tone detector may include applying a Fast Fourier Transform (FFT), Linear Predictive Coding Residual analysis (LPC-R), or Goertzel filters.

The method may further include detecting TDD/TTY or FAX tones at the first subset of tone detection modules. Triggering the series of tone observation notifications by the speech server may be based on tone events broadcast from separate tone detection modules including at least one of the set of universal tone detection modules and at least one of the set of regional tone detection modules.

According to another aspect, the method may further include coupling the plurality of tone detection modules to a control bus and a signal bus, wherein tone events are broadcast on the signal bus, and coupling an observation module to the control bus and the signal bus. The method may further include demarcating tones detected by the plurality of tone detection modules as one of terminal or suppressed. A tone detection function of the plurality of tone detection modules may be controlled by the observation module based on a tone detection event broadcast and a corresponding demarcation of the tone detected. The tone detection function may be controlled based on signaling on the control bus.

The method may further include disarming hunting for the tone in the tone detection function. Hunting may be disarmed if the corresponding demarcation of an observed tone is terminal. Hunting may be disarmed for the tone where the tone type is expected within an initial observation window commencing with the start of a call and a given amount of time has elapsed since the beginning of the call. The tone detection event may be propagated to one or more of the plurality of tone detection modules with the corresponding demarcation of the tone suppressed.

The method may further include opening an XML file on the speech server and configuring the tone detector modules based on the Extensible Markup Language (XML) file tone definitions. The method may further include overriding the default configuration on a per-customer, or application basis, to best meet the then-current requirements for an inbound or outbound call.

The method may provide a configuration file with configurations for the plurality of tone detection modules on a per-customer per-application basis and may enable overriding of at least one active configuration by toggling the active configuration based on a specified customer and application.

The method may further include providing a configuration file with configurations for the plurality of tone detection modules. The method may include enabling overriding of at least one active configuration by opening the configuration file and configuring at least one active tone detector module based on the tone definitions specified by the file. The configuration file may be an Extensible Markup Language (XML) file Another example embodiment includes a speech server that may comprise a plurality of tone detection modules configured to disambiguate speech from tones in an audio stream by performing an analysis on the audio stream received. The plurality of tone detection modules may be configured to detect tones based on the analysis and to broadcast tone events based on the tones detected. The speech server may further comprise an observation module configured to trigger a series of tone observation notifications by the speech server based on the series of tone events broadcast by separate tone detection modules.

The plurality of tone detection modules may include a first subset of tone detection modules and a second subset of tone detection modules. The first subset may be configured to detect a set of universal tones or notifications from other modules and the second subset may be configured to detect a set of regional tones or notifications from other modules. The first subset may be configured to detect at least Dual-Tone Multi-Frequency (DTMF) and Answering Machine Device (AMD) tones and the second subset may be configured to detect at least Special Information Tones (SIT) and ringback tones.

The series of tone observation notifications by the speech server may include announcing detection of an Answering Machine Device (AMD) and announcing detection of an end of an AMD greeting message using Session Initiation Protocol (SIP) information messages containing a text payload describing one or more tone observations.

According to another aspect, the observation module may be further configured to delay announcing detection of an end of the Answering Machine Device (AMD) greeting message by the speech server by detecting an initial ringback tone event broadcast to indicate a potential onset of a ringback tone. Further, at least one of the plurality of tone detection modules may be configured to reset the analysis on the audio stream received by detecting a ringback tone event broadcast.

A non-transitory computer-readable medium having encoded thereon a sequence of instructions which, when executed by a processor, causes the processor to disambiguate speech from tones in an audio stream by a plurality of tone detection modules in a speech server by performing an analysis on the audio stream received and detecting tones at the plurality of tone detection modules based on the analysis. The sequence of instructions which, when executed by a processor, may cause the processor to broadcast tone detection events to the plurality of tone detection modules, triggering a series of tone observation notifications based on a series of tone detection events broadcast by separate tone detection modules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3B-1, 3B-2, and 3B-3 illustrate example content of an Extensible Markup Language (XML) document for configuration of a tone detection module in the speech server.

DETAILED DESCRIPTION OF THE INVENTION

A description of example embodiments of the invention follows.

Voice platforms are configured to operate in very disparate telephony environments. Various types of telephony equipment in use, and the country or geographical location where they are operated, each provide different subsets of tone events. Techniques described herein enable voice applications to detect tone events consistently and provide consistent support and accuracy of both inbound and outbound voice applications independent of the hardware or geographical location of the telephony network.

As presented above, a voice browser is responsible for processing Voice Extensible Markup Language (VoiceXML, or VXML) documents. VoiceXML has tags that instruct the voice browser to provide speech synthesis, automatic speech recognition, dialog management, basic call control, and audio playback. However, VoiceXML does not have tags for handling (nor does the VoiceXML protocol specify a standard mechanism for handling) telephony device detection or telephony device signaling beyond Dual-Tone Multi-Frequency (DTMF) signaling. VoiceXML constrains DTMF support to a recognition context. Thus, third-party telephony card vendors or Voice-over-Internet Protocol (VOIP) gateways interfacing with the voice platform are relied upon to detect telephony devices by way of telephony tones.

Voice platform reliance on third-party telephony card vendors or gateways to detect telephony devices by way of telephony tones is not always reliable because of insufficiencies and inconsistencies with the disparate commercial options of those products that have been recognized by the inventors. For example, configurations of vendor telephony gateways may be limited and proprietary. Telephony gateway vendors may not provide control over the tones that their gateways detect, limiting the type of tones that may be detected. Therefore, the tone detection functions and performance of telephony gateways is vendor specific and inconsistent dependent upon the specific implementation of the vendor.

The various tones that go undetected by the telephony gateways may be sent into the telephone network, depending on the vendor specific gateway implementation, resulting in inconsistent behavior regarding the particular telephony devices and telephony tones that may be detected. Thus, an application (described earlier) cannot be guaranteed to achieve the same accuracy, nor the same feature set, when the fronting hardware of the integration topology varies.

Figure 1:
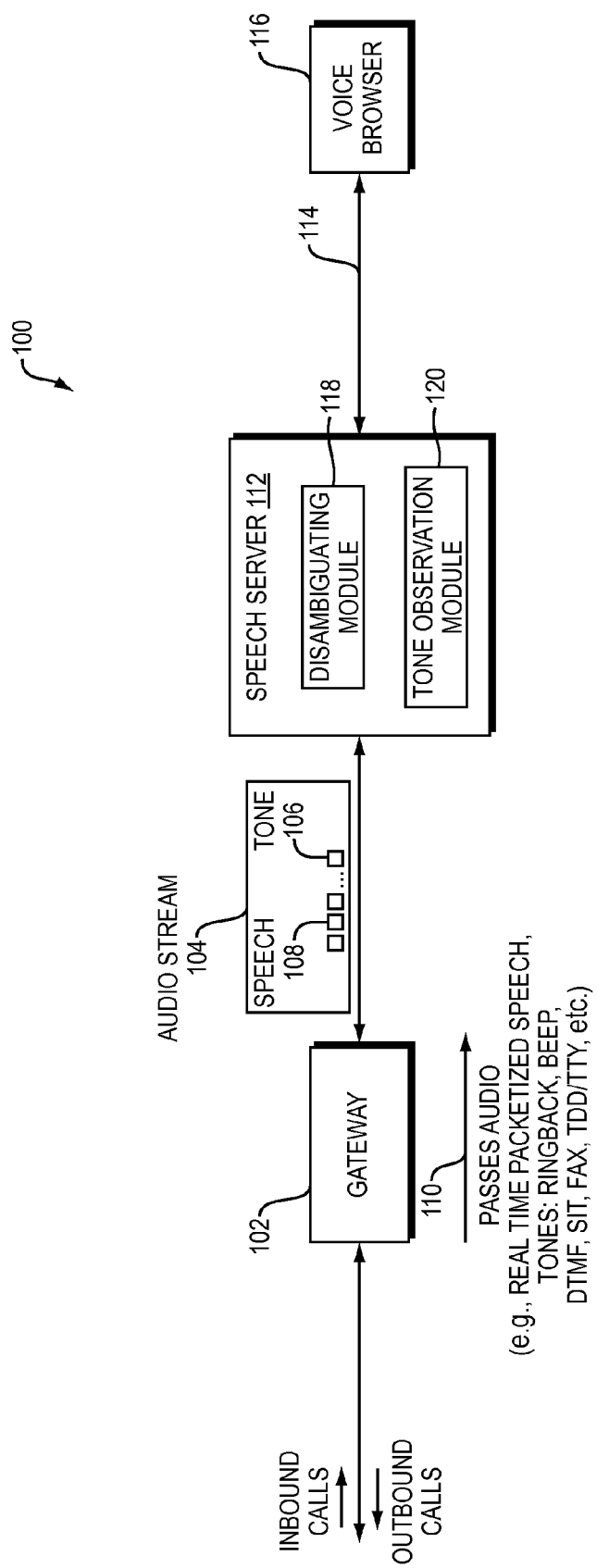
FIG. 1 illustrates a telephony network including a gateway, speech server, and voice browser, with the speech server including a disambiguating module to disambiguate speech from tones and a tone observation module to trigger a series of tone observation notifications.

FIG. 1 illustrates a telephony network 100 including a gateway 102 configured to pass an audio stream 104 including audio tones 106 and speech 108 directly through 110 to a speech server 112 that includes a disambiguating module 118 and a tone observation module 120. The audio stream 104 may be received from an answering machine device or any other suitable telephonic device or network. By opening up telephony gateways such that an audio stream including audio tones and speech is passed directly through to the speech server 112 that couples tone detection and speech recognition processing, novel methods for detecting telephony devices and telephony tones is provided by the speech server 112. Techniques applicable to both inbound and outbound calls may identify, in the speech server 112, a set of in-band telephony tone signals, and answering machines, which would otherwise go undetected by most gateways.

The speech server 112 provides audio stream analysis for tone detection in addition to speech detection and, where run in-process, recognition. By performing both tone detection and speech recognition in a single component, the speech server, the number of components doing digital signal processing may be reduced. By including tone detection in the speech server, the speech server may communicate tone events detected at the telephony level.

According to one aspect, the speech server 112 may simply provide tone event information by way of tone observation messages 114 to the voice browser 116. Tone observation messages 114 may be sent as Session Initiating Protocol (SIP) messages, or any other suitable message type, directly from the speech server 112 to the voice browser 116. The speech server may provide inclusive support for RFC 2833 notifications.

By directly equipping the speech server 112 with tone detection coupled with speech processing, the speech server 112 can detect telephony devices and tone signaling and generate consistent observation notifications that the voice browser 116 can use. Telephony device and tone observations may be sent from the speech server 112 directly to the voice browser 116 through SIP INFO messages. Tone and speech detection may be provided by the speech server 112 directly from the audio stream 104 received from the gateway. The audio stream 104 may be a Real Time Packetized (RTP) packetized audio stream. By direct integration of the speech server 112 to the RTP stack, signal detection is not restricted to recognition states. The voice browser 116 is enabled to provide SIP INVITE headers to the speech server 112. For example, during a setup phase a SIP INVITE header may be used to indicate that the speech server is to detect an answering machine. A SIP INVITE header may be provided to permit the voice browser 116 to reactivate a feature mid-call, for example, following a call transfer.

Figure 2:
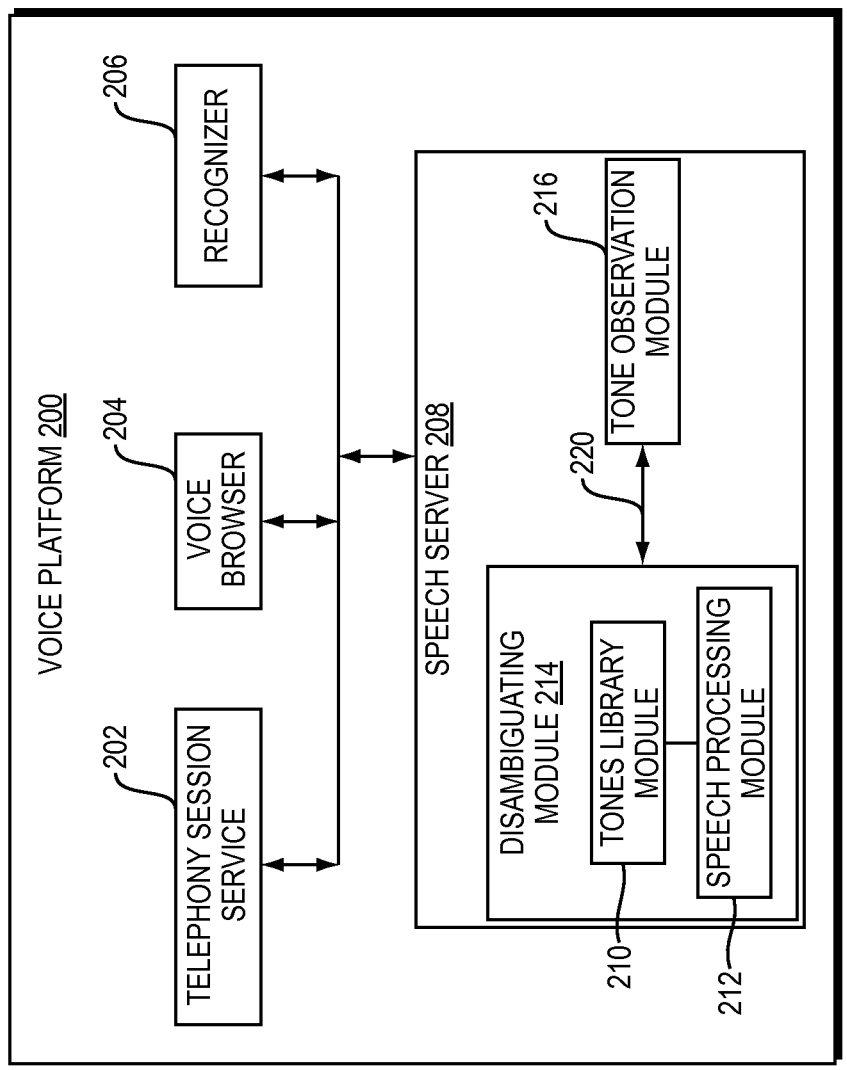
FIG. 2 illustrates a voice platform including a telephony session service, voice browser, recognizer, and speech server including a disambiguating module with a tones library module and a speech processing module.

FIG. 2 illustrates a voice platform 200 including a Telephony Session Service (TSS) 202, voice browser 204, recognizer 206, and speech server 208. The Telephony Session Service (TSS) 202, voice browser 204, recognizer 206, and speech server 208 communicate over a channel 218 in any suitable manner. Channel 218 may be a bus, wireless, or any other suitable connection for communication. Speech server 208 includes a disambiguating module 214 that may include a tones library module 210 and a speech processing module 212. Tones library module 210 and speech processing module 212 may be connected by a bus or any other suitable connection. Disambiguating module 214 communicates with tone observation module 216 to communicate device and tone detection events that may be used by the tone observation module 216 to notify the Telephony Service (TSS), voice browser 204, or recognizer 206 of an observation associated with events detected by the disambiguating module 214. Techniques described herein combine speech processing with tone detection in the speech server 208 to communicate telephony device and signaling events directly to the voice browser 204 in a consistent and flexible manner. Communication between the modules is presented in detail in the figures that follow, including later sequence diagrams illustrated in FIGS. 6-12.

Figure 3A:
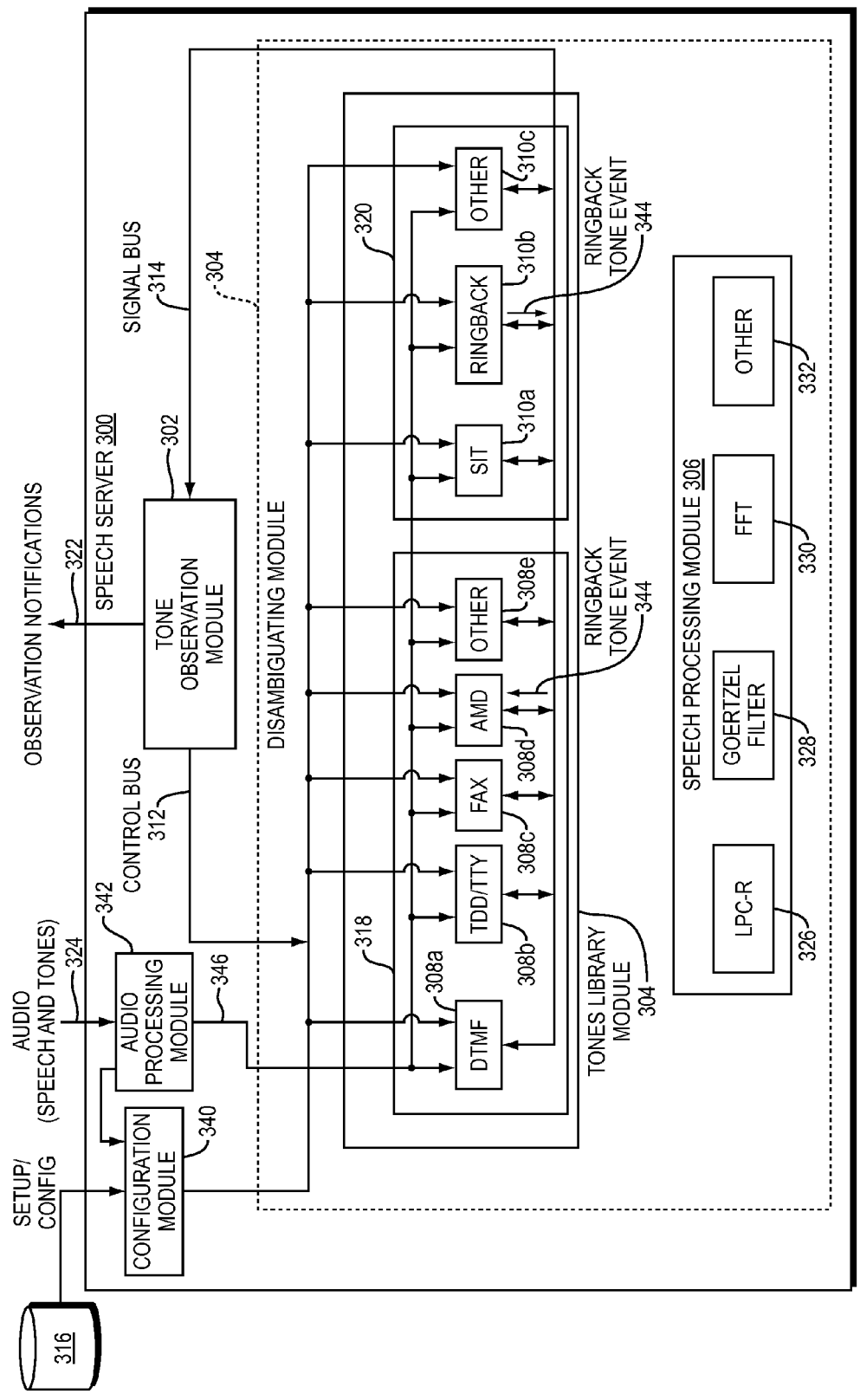
FIG. 3A illustrates a speech server including a tone observation module, tones library module, and speech processing module.

FIG. 3A illustrates a speech server 300 that includes a tone observation module 302, and a disambiguating module 334 comprising tones library module 304, and speech processing module 306. Disambiguating module 334 and tone observation module 302 may communicate over a signal bus 314 and a control bus 312. However, the disambiguating module 334 and the tone observation module 302 may communicate over a single connection that may be a bus or any other suitable connection.

The speech server 300 receives an audio stream 324 including speech and tones. The received audio stream 324 may be processed by an audio processing module 342. According to one embodiment, audio processing module 342 may include a timer module (not shown), audio converter module (not shown), and pre-emphasis module (not shown). The timer module may be used to configure timing windows for tone detections, for example timers that expire after a given amount of time during which a tone would be detected if present in the received audio stream. The converter module may convert the received audio stream to any suitable format that the tones library module 304 understands. The pre-emphasis module may apply processing to the received audio stream to emphasize speech and tones. The converted audio stream 326 may then be distributed to all tone detection modules in the tones library 304.

The tones library module 304 may include a set of tone detector modules including a plurality of tone detector modules 308a-e and 310a-c. The set of the plurality of tone detector modules may include a first subset and a second subset, the first subset being a set of universal tone detection modules 308a-e (e.g., tone detector modules for detecting tones applicable to all dial regions—FAX, DTMF, TDD/TTY, and others) and the second subset being a set of regional tone detection modules 310a-c (e.g, tone detector modules for detecting tones specific to a dial region—Special Information Tones, Ringback, and others).

The set of universal tone detector modules 318 may include one or more of a Dual-Tone Multi-Frequency (DTMF) tone detector module 308a, TDD/TTY tone detector module 308b, FAX tone detector module 308c, Answering Machine Device (AMD) tone detector module 308d, and other universal tone detectors 308e as may be known by those skilled in the art. The set of regional tone detector modules 320 may include one or more of a Special Information Tones (SIT) detector module 310a, a ringback tone detector module 310b, and other regional tone detectors 310c as may be known by those skilled in the art. The tone observation module 302 may be coupled to the plurality of tone detector modules in the tones library module 304 by the control bus 312 and the signal bus 314.

Techniques described herein provide a single enablement and configuration format to be used independently of the telephony hardware. The speech server 300 provides dynamic flexible tone configuration including enabling the tones and devices to be detected as well as enabling the specifying of tone characteristics for tones. By providing customization of an extensible set of tone signals and the great variation in tone patterns and regional tolerances thereof, a dynamic tone detection configuration that is region agnostic is provided by the speech server 300.

Dynamic configuration of a tone detection module in the tones library module 304 includes configuration for defining an arbitrary tone sequence to be detected. A transfer attribute may be provided by the active configuration to activate Answering Machine Device (AMD) driven termination of a call transfer-operation or to alternatively process AMD event notifications in a Far End Dialog, as part of a consultation transfer. For example, the speech server may provide interoperability with a callback manager where there is an agent (e.g., Party A) who is waiting to speak to the customer that the system is calling on a transfer leg. Where an answering machine device is detected, the system can leave a message while releasing the agent.

The speech server 300 may include a configuration module 340 for setup and configuration. The configuration module 340 may include a toggle activity module (not shown) that enables and disables an active state of each tone detector module. The setting of the active state of a tone detector module may be based on an output from the audio processing module based on an output from the audio processing module 346 indicating a timer expiration detected for a particular tone. The configuration module 340 may access a database 316 for setup configuration that may include a configurable Extensible Markup Language (XML) file to configure the plurality of tone detector modules in the tones library module 404. The configurable tone detection may be implemented in any suitable manner such as by providing an Extensible Markup Language (XML) configuration that may be updated and used by the speech server. For example, an editable XML file may be utilized describing the tones to be recognized. A subdivision of configuration may be provided such as global configuration, universal tone set configuration, and region specific tone pattern configuration.

The flexible configuration may include assignable text labels for each sequence of tones comprising a tone signal, the labels may be used to formulate descriptive event notifications. The flexible configuration may include per-customer or per-application session control to enable/disable individual tone sets and to override a baseline configuration. For example, a speech server may operate in a hosted environment where the speech server is shared among several customers. In such a scenario, for the same application, the flexible configuration enables calls to be placed on behalf of customer A using a different configuration than a configuration used for calls to be placed for customer B. A file, such as an Extensible Markup Language (XML) file, or any other suitable file, may act as the baseline. The baseline may be overridden by editing the file. A speech server may be pointed to a different baseline file. An application may elect to programmatically enable or disable the detection of various tones through runtime parameter sets with the speech server. A file could be issued to the instance of the tones library involved in a particular session, for example, at the start of the session, overriding the settings and configuration expressed by the baseline, to best meet the needs of a particular customer for their application.

By updating one or more Extensible Markup Language (XML) files of database 316, the set of universal tone detector modules 318 and the set of regional tone detector modules 320 may also be extended to include other tone detector modules, such as 308e and 310c.

FIGS. 3B-1, 3B-2, and 3B-3 illustrate example content of an Extensible Markup Language (XML) document for configuration of a tone detection module in the speech server 300. The active configuration is dynamic and may enable only one of the universal tone detector modules 318, or one of the regional tone detector modules 320, none of the tone detector modules in the tones library 304, or a mix of any of the tone detector modules in the tones library 304.

By detecting a received audio stream 324, speech server 300 may arm the plurality of tone detector modules in the tones library module 304. Once armed, the plurality of tone detector modules may begin hunting for respective tones based on the configuration of the particular tone detector module. Database 316 may include timeout configuration for each of the plurality of tone detector modules such that armed tone detector modules in the tones library 304 may be shutdown by determining that a respective tone for a tone detector module was not detected within a specified range of time. The specified range of time may be dynamically configured by updating the database 316. The plurality of tone detector modules in the tones library 304 may be shutdown (e.g., disarmed) automatically or may be shutdown based on controlled signaling of the control bus 312, based on configuration.

According to one aspect, tones detected by the plurality of tone detection modules may be demarcated in the configuration as one of terminal or suppressed. The tone observation module 302 may control a tone detection function of the plurality of tone detection modules, such as the arming and disarming of a tone detection module's hunting function. For example, tone observation module 302 may disarm the hunting function of the Special Information Tones (SIT) detection module 310a or the FAX tone detection module 308c based on receiving a tone event broadcast by another tone detection module if the respective tone configuration is terminal.

Speech server 300 may provide a silent, automatic deactivation of tone hunting after a period of time after which it is determined to be unlikely that a specific tone or sequence of tones can still be detected. For example, TTY, FAX and SIT tones may only appear at the beginning of a call. Other tone signals, such as Dual-Tone Multi-Frequency (DTMF), may persist throughout the duration of a call session. According to another aspect, the tone observation module 302 may determine not to communicate a tone notification externally if the observed tone is demarcated suppressed.

The signal bus 314 may be used to inform the plurality of tone detector modules in the tones library 304 of a tone detection event determined by a tone detector of the tones library 304. For example, a tone detection event, such as the ringback tone event 344 shown in FIG. 3A, may be communicated to Answering Machine Device (AMD) tone detection module 308d, to the plurality of tone detection modules, or to a subset of the plurality of tone detection modules. The tone detection event may additionally be communicated to the tone observation module 302. An individual tone detector module may determine what to do with a receipt of another modules's tone notification.

The tone detection event may be communicated by a tone detector module to the plurality of tone detector modules by broadcasting a message specifying the tone detection event on the signal bus 314. Tone observation module 302 may receive all tone detection events broadcast on the signal bus 314 and make a determination as to whether or not to generate one or more tone observation notifications 322. By enabling the plurality of tone detection modules and the tone observation module 302 to receive broadcast tone detection events, an earlier decision as to the type of end point entity (e.g., human or answering machine device) may be reverted.

Notification of tone events may be sent by the speech server as tone observation messages containing a text payload describing the event to a voice browser. The observation messages may be Session Information Protocol (e.g., SIP INFO) messages, or any other suitable type of message that provides a text payload describing the event. The observation messages may be sent over any suitable type of connection between the speech server and the voice browser. The voice browser may include a Voice Extensible Markup Language (VoiceXML, or VXML) interpreter module and the observation messages may be exposed by the voice browser as custom VoiceXML events usable by VoiceXML applications running on the VoiceXML interpreter module.

The tone observation notifications 322 may be a series of tone observation notifications that are based on a series of tone events broadcast by separate tone detection modules. The series of tone observation notifications may include announcing detection of an answering machine device and announcing detection of an end of an answering machine detection device greeting message. The tone observation notifications 322 may be sent as Session Information Protocol (SIP) messages, or any other suitable message type of message that enables a text payload describing the event to be contained. The tone observation notifications 322 may be sent directly from the speech server 300 to a voice browser. The speech server 300 may be connected to the voice browser in any suitable manner.

The speech server 300 provides behavior such as if a live caller is first detected, while Answering Machine Device (AMD) detection may occur in parallel, to enable a better user experience overall. Techniques described herein enable Answering Machine Detection (AMD) to revert its decision in favor of device detection, if subsequently, after initially deciding a human has answered, timing criteria, beep-detection, or other observations suggest the end entity is not human.

Answering Machine Device (AMD) detection in the speech server 300 may be more robust as AMD 308d receives preliminary event notifications, as well as notification of completed events, from any tone detection module in the set of configurable tone detection modules that may be implemented in the tones library 304. For example, by providing the configurable ringback tone detection module 310b in the speech server 300, a ringback tone detection event may be broadcast on the signal bus 314 to reduce the likelihood of confusing a ringback tone with a terminal 'beep' tone at the Answering Machine Device (AMD) tone detection module 308d. Ringback occurs during a call transfer and may be confused with the terminal 'beep' tone that signifies the end of the call. Furthermore, ringback may indicate the continuance of the call where subsequent audio may be a recording of speech from a different person and the library may adjust itself accordingly. Answering Machine Device (AMD) tone detection may therefore follow a call through a transfer.

By detecting a ringback tone and providing an event notification thereof, the speech server 300 may have an improved opportunity for signaling of the appropriate (e.g., a true opportune) moment by the tone observation module 302 for an application to leave a message, thereby supporting automation. The tone observation module 302 may receive a series of tone events, for example a tone event broadcast on the signal bus by the Answering Machine Device (AMD) tone detection module 308d that indicates that an answering machine has been detected, and a tone event broadcast on the signal bus by the ringback tone detection module 310b, such that it may determine when to send tone observation notifications to the voice browser announcing that an answering machine was detected and that an end-of-greeting message was subsequently detected.

Telephony applications may require a richer set of tone detection than is provided by a telephony gateway. For example, an outbound dialing campaign requires consistent, accurate, answering machine detection since an outbound call may be answered by a human, an answering machine, or a recording service. Existing techniques in telephony systems are prone to incorrectly disambiguate between a human and an answering machine device answering an outbound call. By coupling the tones library module 304 with the speech processing module 306, the speech server 300 disambiguates speech from tones in an audio stream by performing an analysis on the audio stream received and by detecting tones at a plurality of tone detection modules based on the analysis.

The speech server 300 may include speech processing module 306 in addition to in the tones detector library 304 to provide improved tone detection by performing tone detection as a function of speech characteristics as well as energy. The speech processing module 306 may include a Linear Predictive Coding Residual analysis (LPC-R) module 326, Goertzel filters module 328, and Fast Fourier Transform (FFT) module 330, as well as other speech processing functional modules 332 that may be utilized for speech processing. The plurality of tone detection modules in the tones library module 304 may utilize none, or one or more of any of the speech processing modules 326, 328, 330, and 332. The speech processing module 306 may be used by any of the components of the disambiguating module 334 to formulate higher-level observations.

The Dual-Tone Multi-Frequency (DTMF) tone detection module 308a may be more robust in the presence of talk-off by utilizing speech processing modules Residual analysis (LPC-R) module 326 and Goertzel filters module 328 for detection of the DTMF tones. Speech of a human voice may mirror DTMF for short periods (e.g., 10-20 msec) of time and may be misinterpreted as DTMF. Talk-off occurs when a human voice incorrectly triggers recognition of a Dual-Tone Multi-Frequency (DTMF) tone. The DTMF tones detection module 308a in the speech server 300 may apply Linear Predictive Coding Residual analysis (LPC-R) as well as Goertzel filtering based on a second harmonic to perform a deep hunt for human speech disambiguating speech from tones, thereby guarding against talk-off.

The Answering Machine Device (AMD) tone detection module 308d may incorporate broad spectrum signal tone beep analysis. The end-of-greeting notification may be sent immediately following detection of a 'beep', instead of waiting for the elapse of various timing constraints, thereby enabling a more responsive system.

The Answering Machine Device (AMD) tone detection module 308d may include advanced spectral energy based noise and speech modeling in addition to voiceness analysis. The AMD tone detection module 308d enables robust device and tone detection by utilizing speech processing methods for the detection. The speech server 300 enables disambiguation between human voiceness and tones such as a beep.

For example, a frame energy test may be applied to the audio stream 324 received. A non-linear Signal-to-Noise Ratio (SNR) test may be applied. The SNR test may include a SNR threshold that adapts to the noise level. The SNR test may provide a "score" in order to classify the received audio as being "below," "above," or "in speech." Fast Fourier Transform (FFT) processing made available by FFT module 330 may be applied as part of the voicing analysis to determine one or more frequencies of significant energy in order to determine voice content (speech) based on the harmonic content determined by the processing. Likewise, Linear Predictive Coding Residual analysis (LPC-R) or other techniques may be used.

In applications, such as the outbound dialing campaign, when a machine has answered the call, an identification of when it is best to initiate leaving a message is required. The speech server 300 that includes tone detection provides consistent support for telephony device detection and signaling thereof. To better support outbound dialer campaign applications, a tuple of Voice Extensible Markup Language (VoiceXML) events specific to answering machine device detection is introduced. The tuple includes a machine detection event, and a subsequent, optimally timed, end-of-greeting message.

Figure 4:
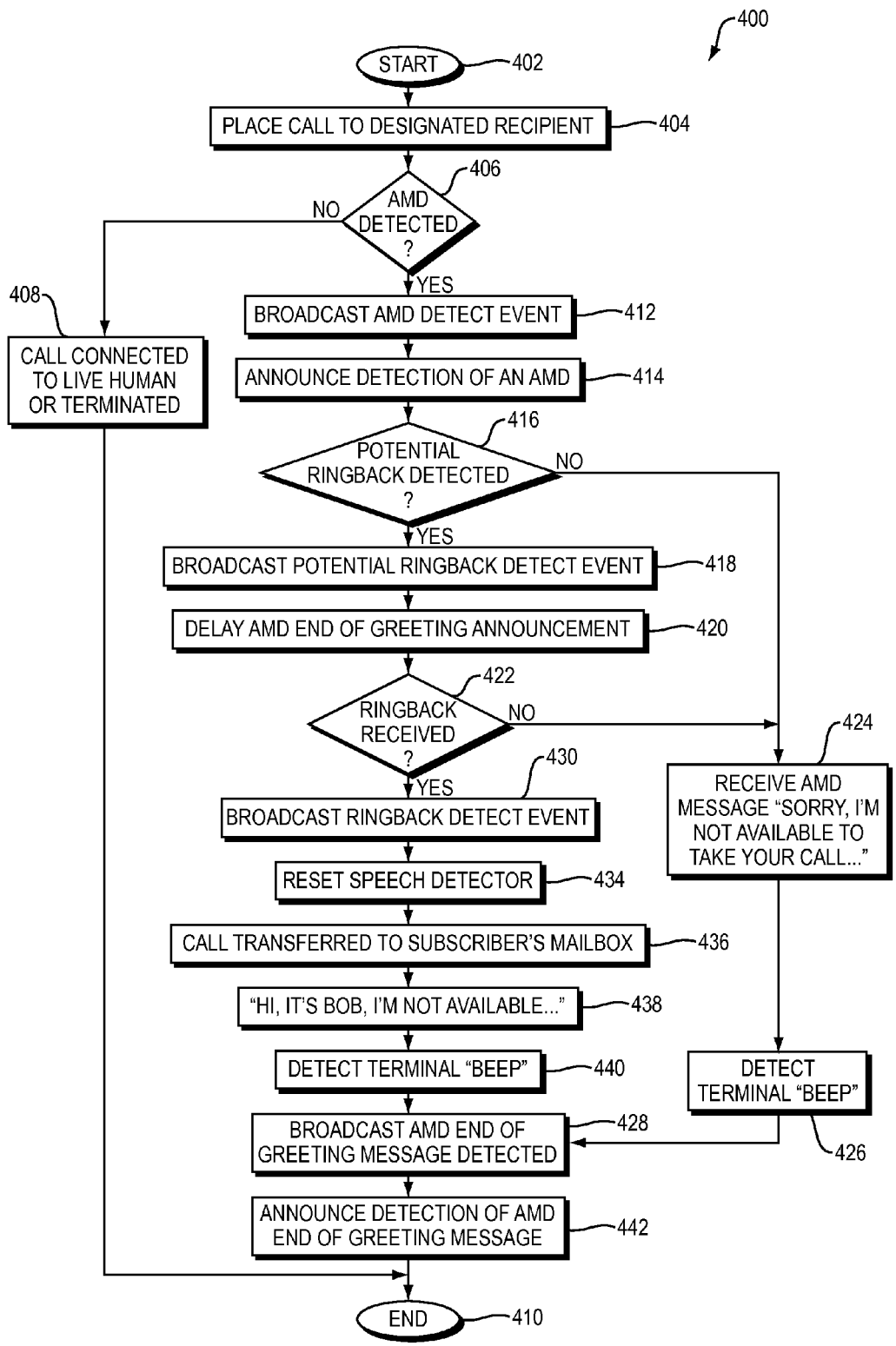
FIG. 4 is a flow diagram of a method for detecting answering machines in a speech server.

FIG. 4 is a flow diagram of a method 400 for detecting answering machines in a speech server that includes following a call to the final end point device in the presence of ringback. Support for Answering Machine Detection for both outbound calls and bridge/consultation transfers are provided. Methods for detecting answering machines in the speech server includes disambiguating a ringback tone from a terminal 'beep' tone and may include resetting speech detection methods based on the observation that ringback is detected.

Conventional techniques may timeout instead detecting a terminal beep after a call transfer, or may misinterpret ringback as a tone that signals an application to leave a message prematurely. The flow diagram of FIG. 4 demonstrates utilizing an understanding that the call is being transitioned (e.g., within a mail service that provides a first greeting, such as a service message) and then redirected (e.g., to a mail service subscriber's mailbox).

Method 400 begins (402) and then a call is placed to a designated recipient (404). The Answering Machine Device (AMD) tone detection module 308d hunts for tones to detect an answering machine device (406). If an answering machine device is not detected, then the call is connected to a live human and or terminated (408) and the method may end (410). Alternatively, if the Answering Machine Device (AMD) tone detection module 308d detects an answering machine device, an event indicating that the answering machine was detected is broadcast (412) to at least one of the plurality of tone detection modules in the tones detection library module 304 and the tone observation module 302. A tone observation notification announcing detection of an answering machine (414) is generated by the tone observation module 302 enabling speech server 300 to communicate the announcement (322) to a voice browser.

The ringback tone detection module 310b hunts for ringback tones (416). If potential ringback is detected, an event indicating that potential ringback was detected is broadcast (418) to at least one of the plurality of tone detection modules in the tones detection library module 304 and the tone observation module 302. A tone observation notification announcing detection of an end of an Answering Machine Device (AMD) greeting message is delayed (420).

The ringback tone detection module 310b concludes whether or not ringback was received (422). If ringback was not received, the Answering Machine Device (AMD) greeting message is received, for example, "Hi, it's Bob, sorry I cannot take your call right now . . . " (424) and an AMD terminal 'beep' is detected (426). The Answering Machine Device (AMD) tone detection module 308d broadcasts an event indicating the detection of the Answering Machine Device (AMD) end-of-greeting message (428) to at least one of the plurality of tone detection modules in the tones detection library module 304 and the tone observation module 302 generates a tone observation notification announcing detection of an end of an Answering Machine Device (AMD) greeting message (442), providing the optimal timing for when an application should begin to leave a message, and the method ends (410).

Alternatively, if ringback was received, then the ringback tone detection module 310b broadcasts an event indicating the detection of ringback (430) to at least one of the plurality of tone detection modules in the tones detection library module 304 and the tone observation module 302. For example, an Answering Machine Device (AMD) may have been detected in response to receiving a mailbox service message (406), for example, "Sorry, the party you are trying to reach is currently unavailable . . . ," and speech detection in the speech server may be reset (434). The call transfers to the mailbox service subscriber's mailbox (436) and a personal message of the designated call recipient, for example, "Hi, it's Bob, sorry I cannot take your call right now . . . " (438).

Further, the Answering Machine Device (AMD) tone detection module 308d detects a terminal 'beep' (440) and broadcasts an event indicating the detection of the Answering Machine Device (AMD) end-of-greeting message (428) to at least one of the plurality of tone detection modules in the tones detection library module 304 and the tone observation module 302 generates a tone observation notification announcing detection of an end of an Answering Machine Device (AMD) greeting message (442), providing the optimal timing for when an application should begin to leave a message, and the method ends (410). Initial answering machine device detection may have occurred with the service message, before the ringback. In preparation for the next leg of the call (e.g., the next recording) the speech server may re-arm or re-initialize itself. Even if the speech server has not detected an answering machine with the service message, it may later correct an answering machine device (AMD) detection decision during the next leg of the call or, at worst, based on the detection of a terminating 'beep' of the personal message. The order of the recordings may be reversed—for example, the first message received may be that of the subscriber and the second may be that of the service message.

By detecting the redirection of the call, speech detection methods of the speech server may be reset, enabling a noise bias level (e.g., a default level) to be configured such that speech detection processing does not use a noise bias level based on earlier speech received prior to the redirection of the call. Speech received prior to the redirection of the call is likely to have different speech characteristics than speech received during the next leg of the call following the redirection. By resetting the speech detection, the speech detection is in a better position for disambiguation speech in a phase following the call redirection.

Re-arming modules in the speech server based on the observation that ringback is detected enables noise estimation within the speech server to be restored to use default noise bias levels. For example, a higher speech level characteristic may be present in an audio stream received prior to the ringback as compared to the speech level present in the audio stream after the ringback. By restoring noise estimation bias levels to default bias levels based on ringback detection, the lower speech level, received during the leg of the call following the redirection, may be properly identified as speech, rather than incorrectly identified as noise.

Figure 5:
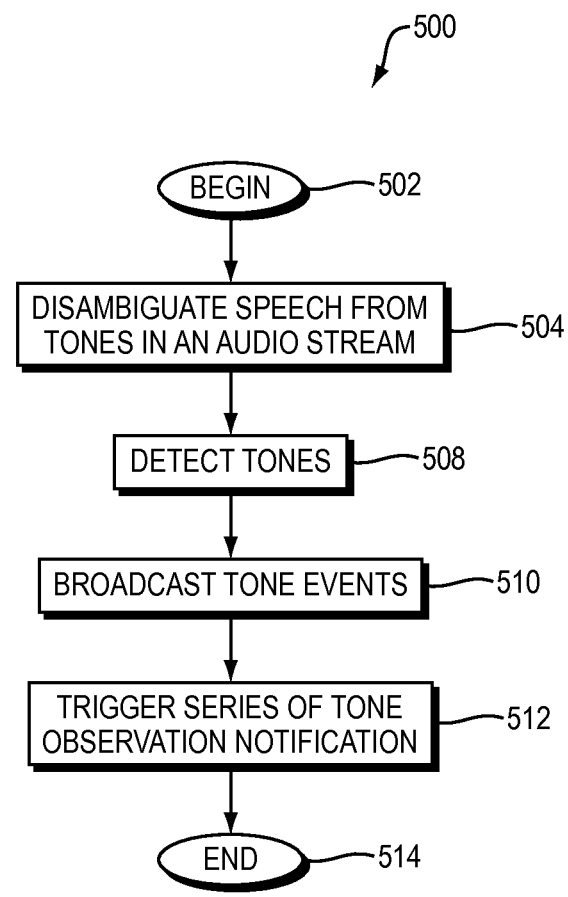
FIG. 5 is a flow diagram of a method in a speech server.

FIG. 5 is flow diagram of a method (500) that begins (502) disambiguating speech from tones in an audio stream by a plurality of tone detection modules in a speech server (504). Disambiguating speech from tones may include performing an analysis on the audio stream received (506). The method may include detecting tones at the plurality of tone detection modules based on the analysis (508). The method may further include broadcasting tone events to at least one of the plurality of tone detection modules (510), and triggering a series of tone observation notifications, the series of tone observation notifications may be based on a series of tone events broadcast by separate tone detection modules (512), and the method ends (514).

Techniques described herein combine speech processing modules with tone detection modules in the speech server to communicate telephony device and signaling events directly to the voice browser, in a consistent and flexible manner that obviates inflexible intermediary third party equipment. The speech server may handle a same audio stream including speech and in-band tones as a speech detector and a speech recognizer.

By providing tone detection modules in the speech server, an improved telephony topology is provided that eliminates an intermediary such as a Control eXtensible Markup Language (CCXML) based server. For example, the speech server provides tone observation messages directly to the voice browser providing a Voice Extensible Markup Language (VoiceXML, or VXML) application with tones notifications without the need for an intermediary server, thus providing a more simplistic application development environment and more efficient signaling.

By eliminating a Control eXtensible Markup Language (CCXML) intermediary, the application development environment does not include writing a CCXML document that calls into fragments of a Voice Extensible Markup Language (VoiceXML) script. The novel methods described herein include extending VoiceXML by a device detection attribute in the active configuration. Therefore, a very simple way for including device detection into transfers is provided, eliminating the need for placing a separate outbound call with device detection enabled and then bridging the audio (as would be required by a CCXML platform).

Figure 6:
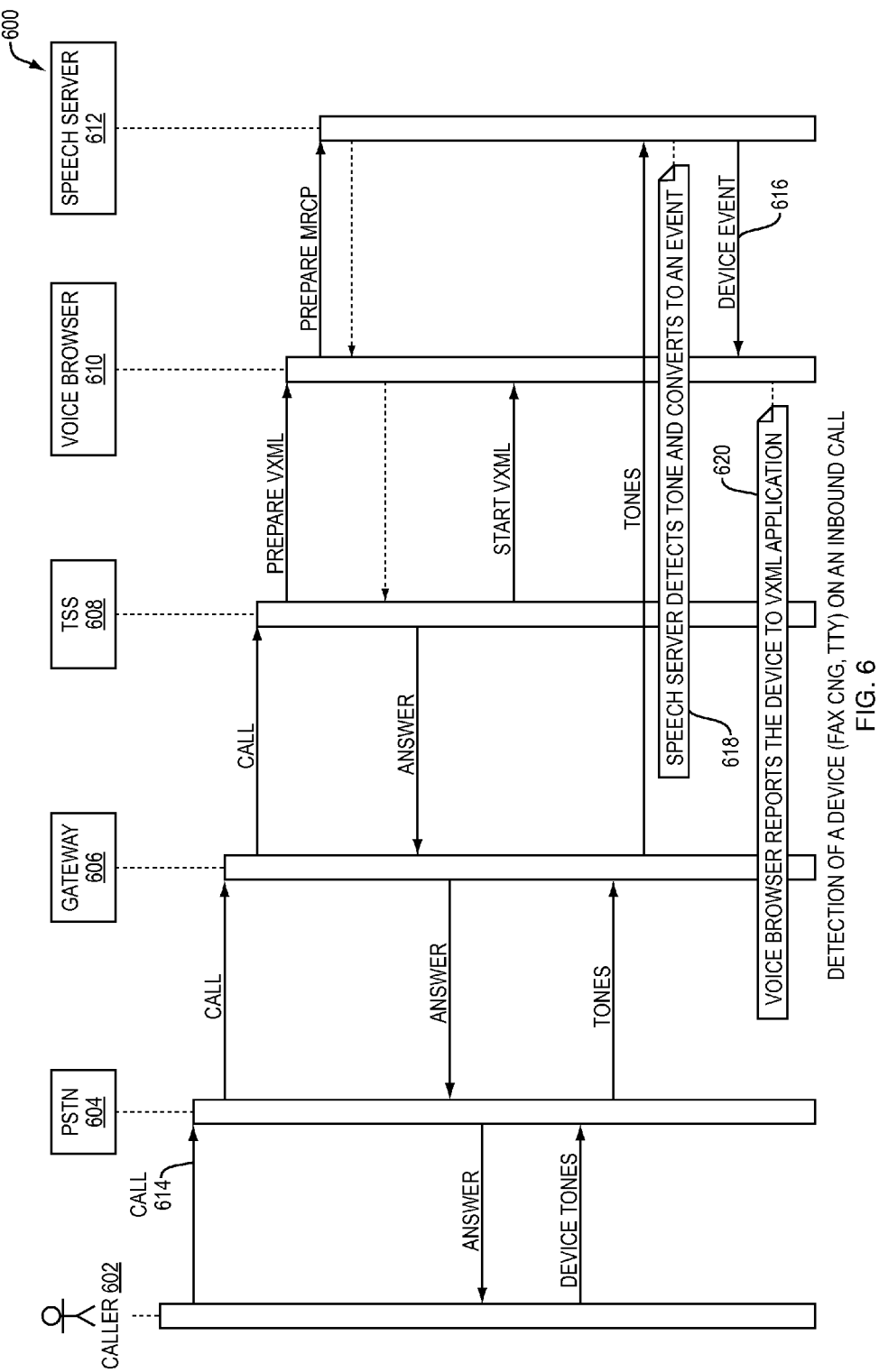
FIG. 6 illustrates a sequence diagram for detection of a device by a speech server on an inbound call.

FIG. 6 illustrates a sequence diagram 600 for detection of a device (e.g., FAX CNG, TTY) by a speech server 612 on an inbound call 614. The sequence diagram 600 includes a caller 602, Public Switched Telephone Network (PSTN) 604, gateway 606, Telephony Session Service (TSS) 608, voice browser 610, and speech server 612. The speech server 612 performs audio characterization of FAX, TTY and answering machine devices arriving in the audio path. The tone detection library module inside the speech server 612 detects these characteristics and generates and event 618. The speech server 612 notifies the voice browser 610 of the device detect event 616. The Voice Extensible Markup Language (VoiceXML) application in the voice browser 610 is notified of the detection of the device 620.

Figure 7:
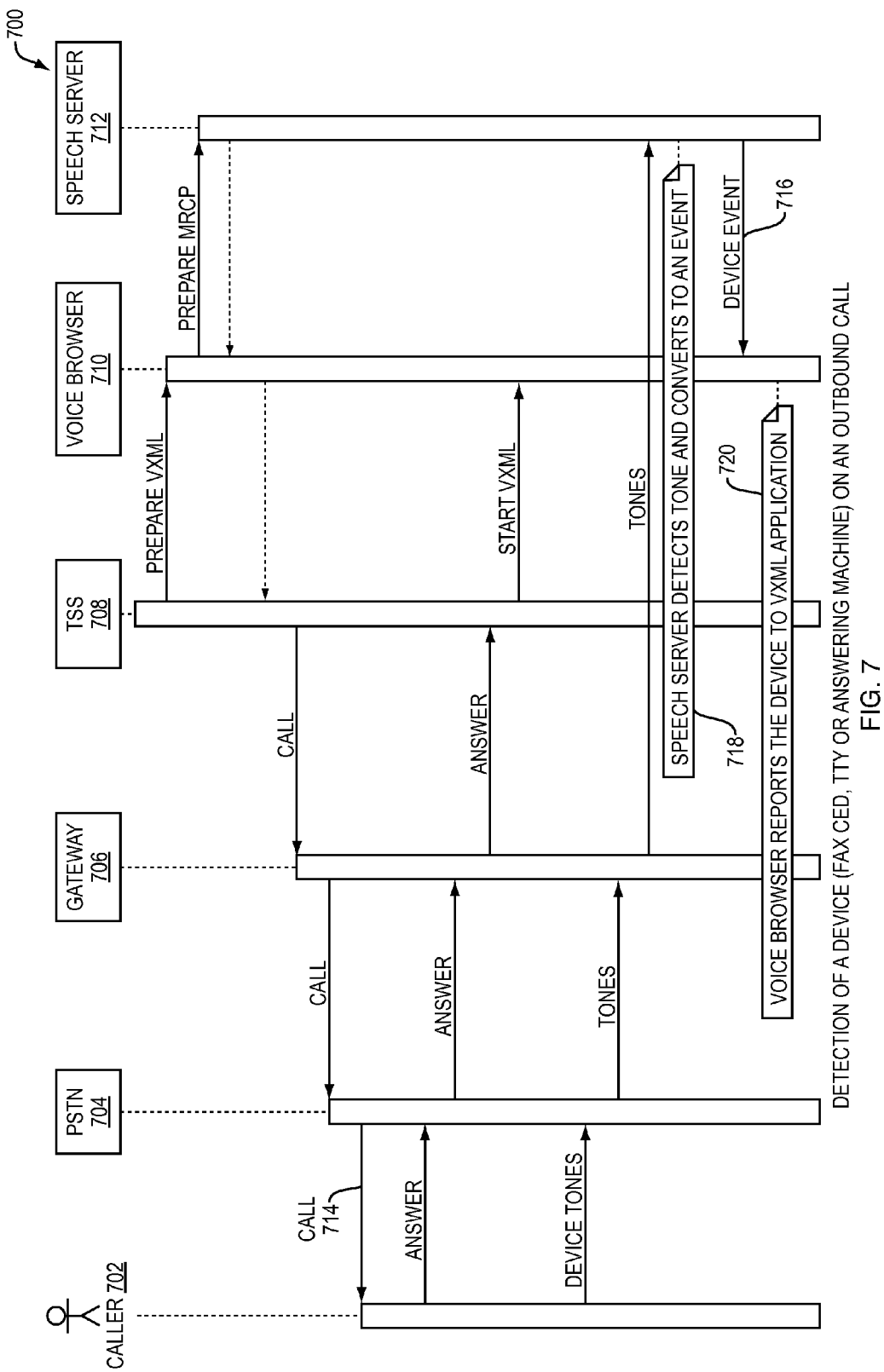
FIG. 7 illustrates a sequence diagram for detection of a device by a speech server on an outbound call.

FIG. 7 illustrates a sequence diagram 700 for detection of a device (e.g., FAX CED, TTY, or answering machine) by a speech server 712 on an outbound call 714. The sequence diagram 700 includes a call recipient 702, Public Switched Telephone Network (PSTN) 704, gateway 706, Telephony Session Service (TSS) 708, voice Browser 710, and a speech server 712. The speech server 712 performs audio characterization of FAX, TTY and answering machine devices arriving in the audio path. The tone detection library module inside the speech server 712 detects these characteristics and generates an event 718. The speech server 712 notifies the voice browser 710 of the device detect event 716. The Voice Extensible Markup Language (VoiceXML) application in the voice browser 610 is notified of the detection of the device 720.

Figure 8:
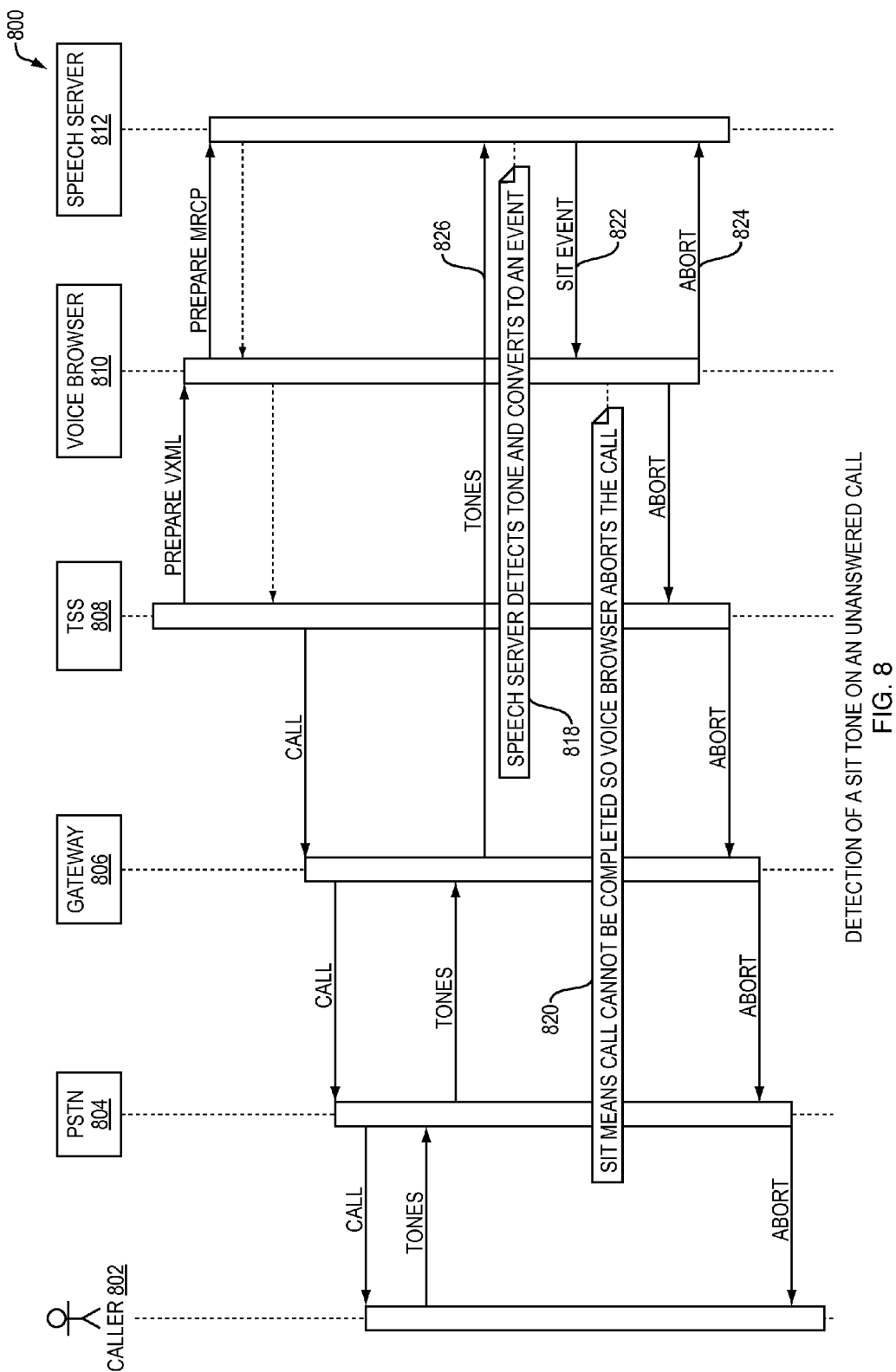
FIG. 8 illustrates a sequence diagram for detection of a Special Information Tone (SIT) on an unanswered call.

FIG. 8 illustrates a sequence diagram 800 for detection of a Special Information Tone (SIT) on an unanswered call. The sequence diagram 800 includes a call recipient 802, Public Switched Telephone Network (PSTN) 804, gateway 806, Telephony Session Service (TSS) 808, voice browser 810, and speech server 812. In this particular case, the network refuses an outbound call and may play Special Information Tones (SIT) 826. Such a call will never go to a connected state so it cannot be handled by the voice browser 810 Voice Extensible Markup Language (VoiceXML) application. The tone detection library module in the speech server 812 detects the Special Information Tones (SIT) and generates and event 818. The speech server 812 notifies the voice browser 810 of the SIT event 822 and the call is aborted 824.

Figure 9:
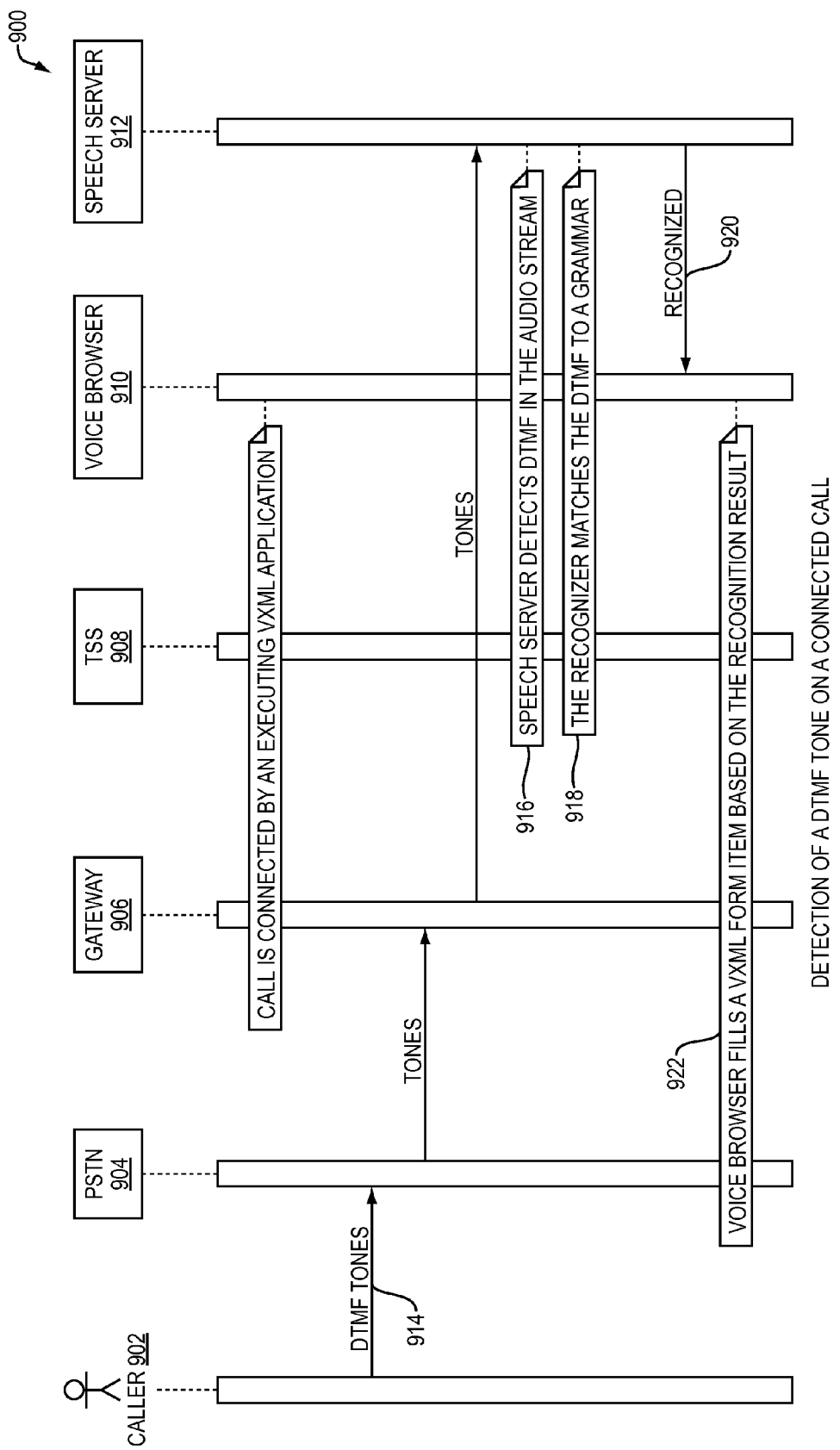
FIG. 9 illustrates a sequence diagram for detection of a Dual-Tone Multi-Frequency (DTMF) tone on a connected call.

FIG. 9 illustrates a sequence diagram 900 for detection of Dual-Tone Multi-Frequency (DTMF) tones 914 on a connected call. The sequence diagram 900 includes a caller 902, Public Switched Telephone Network (PSTN) 904, gateway 906, Telephony Session Service (TSS) 908, voice browser 910, and speech server 912. The speech server 912 performs audio characterization of the Dual-Tone Multi-Frequency (DTMF) tones arriving in the audio path. The tones detection library module inside the speech server 912 detects the DTMF tone characteristics in the audio stream (916), and a recognizer (not shown) matches the DTMF to a grammar (918) and the speech server notifies (920) the voice browser 910 of the recognized event. The voice browser 910 fills a Voice Extensible Markup Language (VXML) form item based on the recognition result (922).

Figure 10:
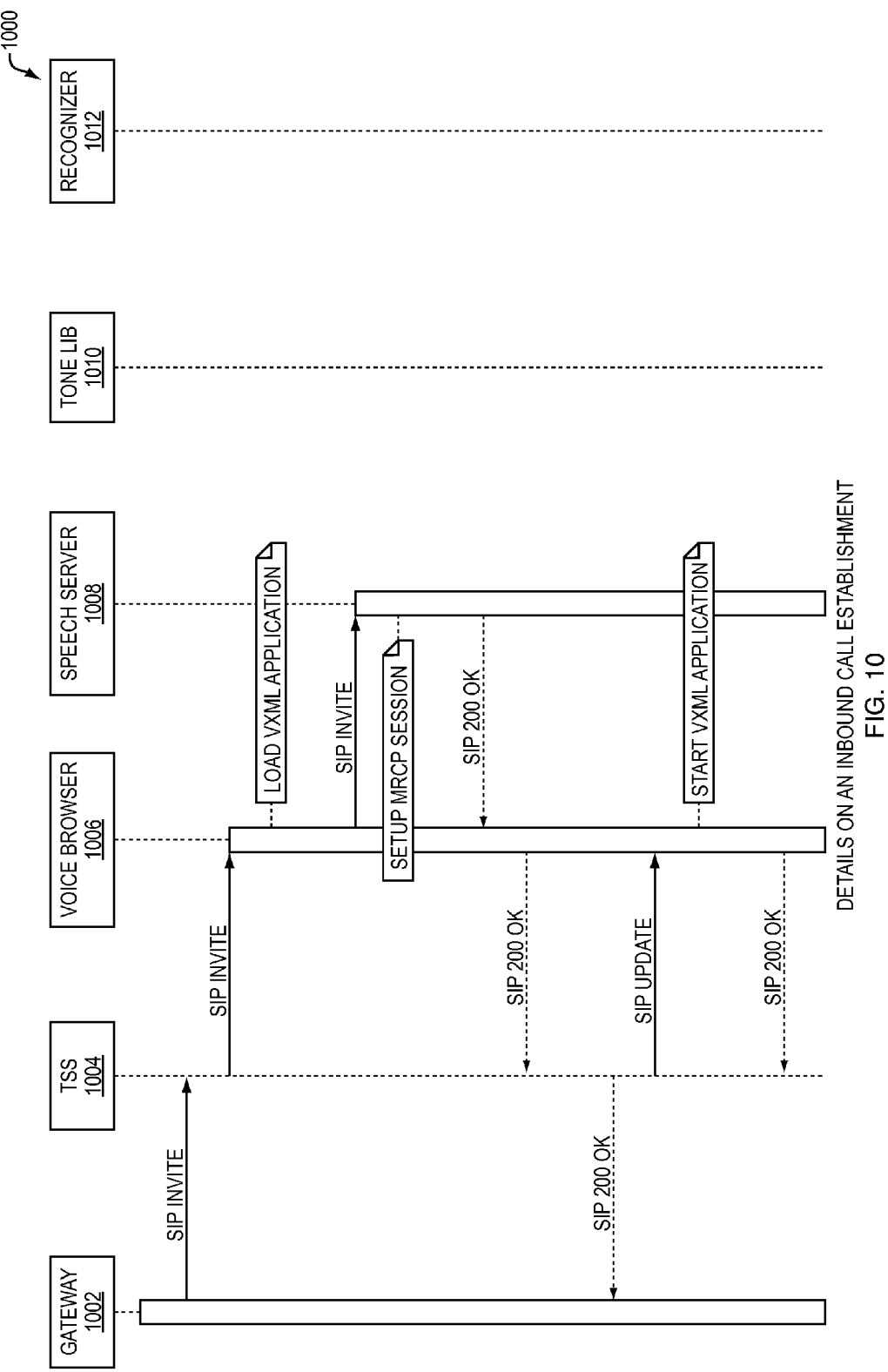
FIG. 10 illustrates a sequence diagram showing details on an inbound call establishment.

FIG. 10 illustrates a sequence diagram 1000 showing details on an inbound call establishment. The sequence diagram 900 includes a gateway 1002, Telephony Session Service (TSS) 1004, voice browser 1006, a speech server 1008, tone library 1010, and recognizer 1012. The speech server 1008 includes the tone library 1010.

Figure 11:
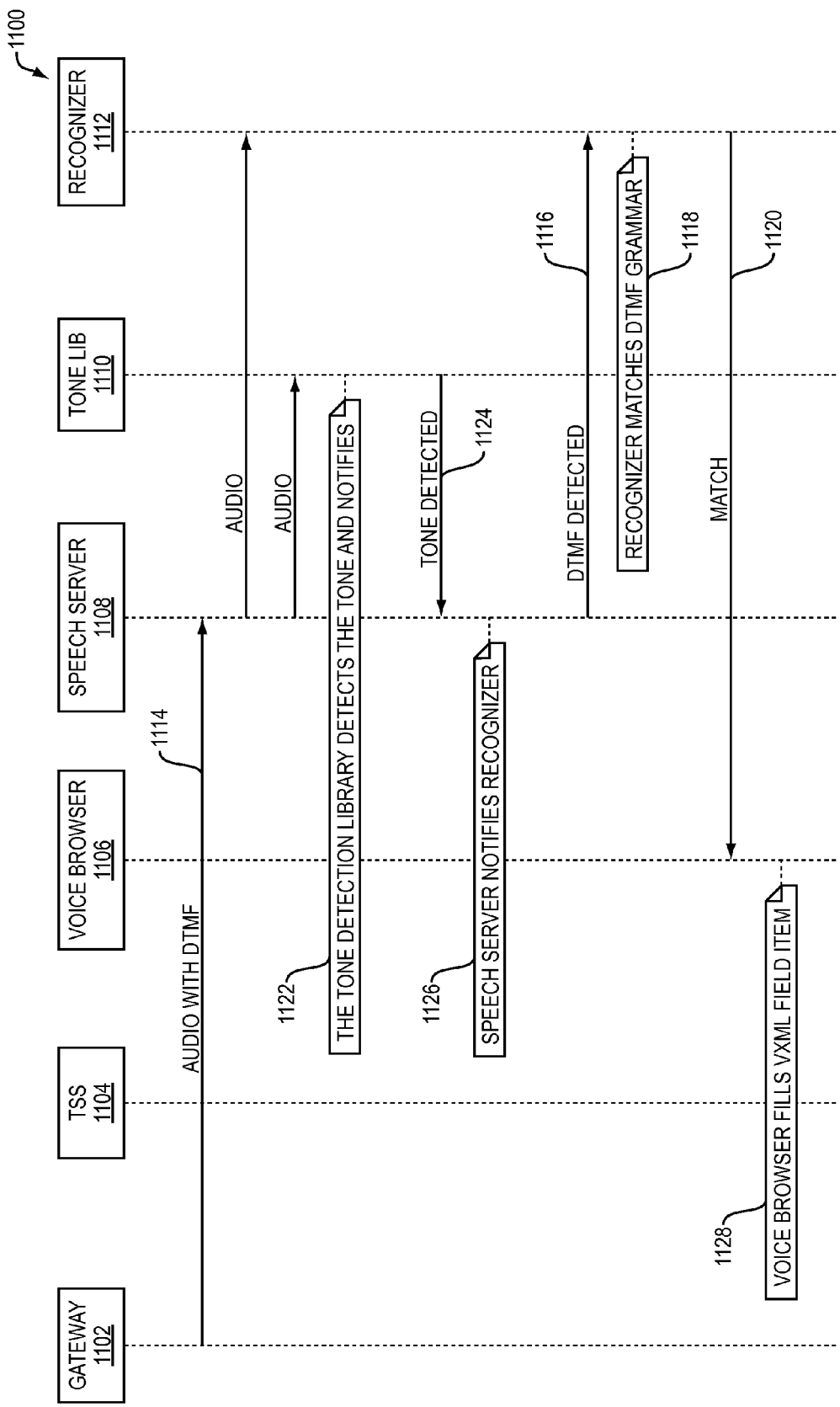
FIG. 11 illustrates a sequence diagram showing details on detection of a Dual-Tone Multi-Frequency (DTMF) tone.

FIG. 11 illustrates a sequence diagram 1100 showing details on detection of a Dual-Tone Multi-Frequency (DTMF) tone. The sequence diagram 1100 includes a gateway 1102, Telephony Session Service (TSS) 1104, voice browser 1106, speech server 1108, tone library 1110, and recognizer 1112. In this embodiment, speech server 1108 is coupled to the tone library 1110. The tone library 1110 performs audio characterization of the Dual-Tone Multi-Frequency (DTMF) tones arriving in the audio path 1114 and notifies 1124 the speech server 1108 of the DTMF detect event 1122. The speech server 1108 notifies (1126) the recognizer 1112 by generating an event that DTMF has been detected (1116). The audio including the DTMF tones is also propagated to the recognizer 1112. The recognizer 1112 matches the DTMF to a grammar (1118) and generates a match result event (1120) to the voice browser 1106. The voice browser 1106 fills a Voice Extensible Markup Language (VXML) form item based on the recognition result (1128).

Figure 12:
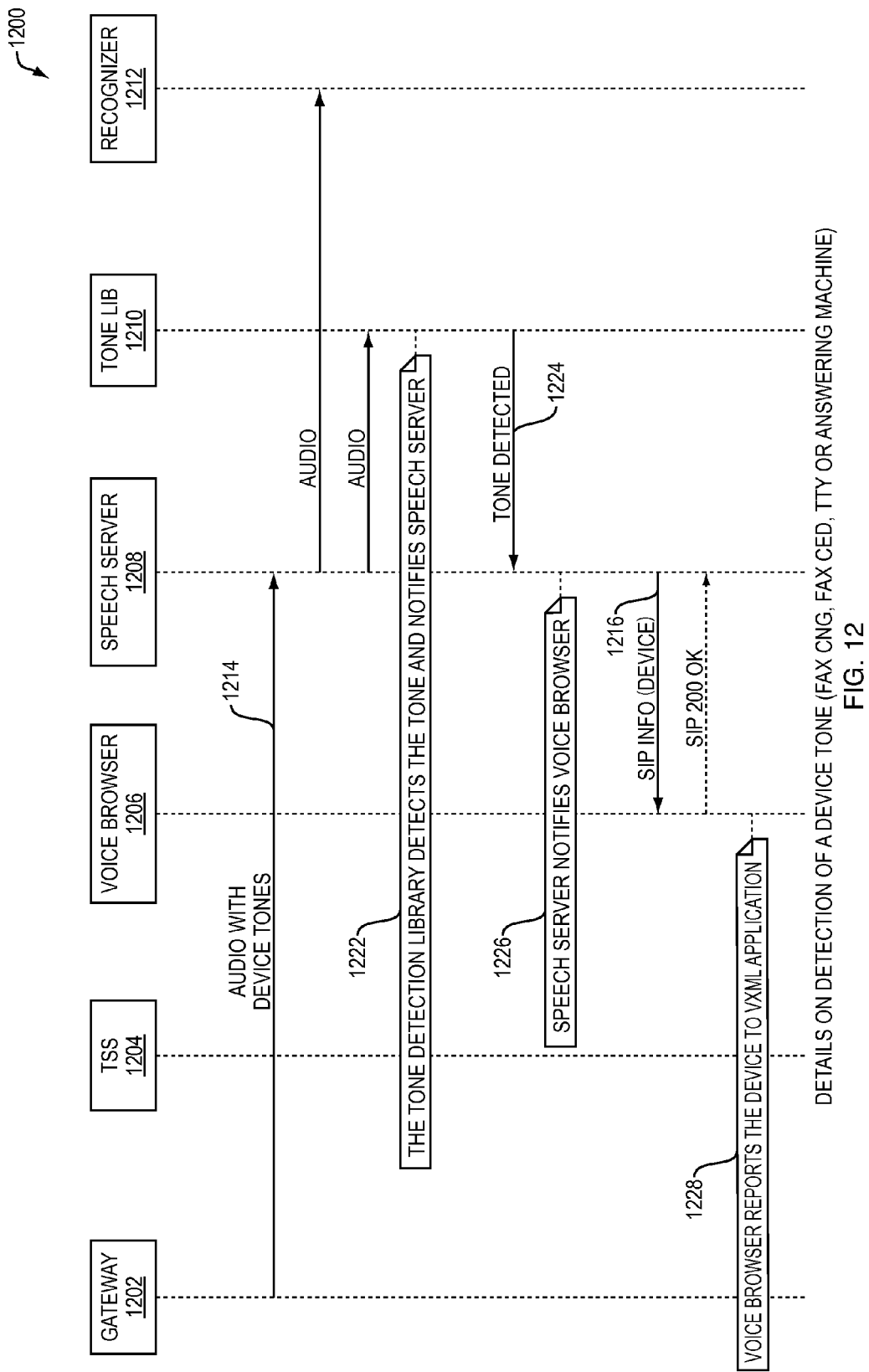
FIG. 12 illustrates a sequence diagram showing details on detection of a device.

FIG. 12 illustrates a sequence diagram 1200 showing details on detection of a device tone (e.g., FAX CED, TTY or answering machine). The sequence diagram 1200 includes gateway 1202, Telephony Session Service (TSS) 1204, voice browser 1206, speech server 1208, tone library 1210, and recognizer 1212. In this embodiment, speech server 1208 is coupled to the tone library 1210. The tone library 1210 performs audio characterization of the device tones arriving in the audio path 1214 and notifies 1224 the speech server 1208 of the device detect event 1222. The speech server 1208 notifies the voice browser 1206 that a device has been detected (1216). The voice browser 1206 fills a Voice Extensible Markup Language (VXML) form item based on the recognition result and reports the device to the VXML application (1228).

Figure 13:
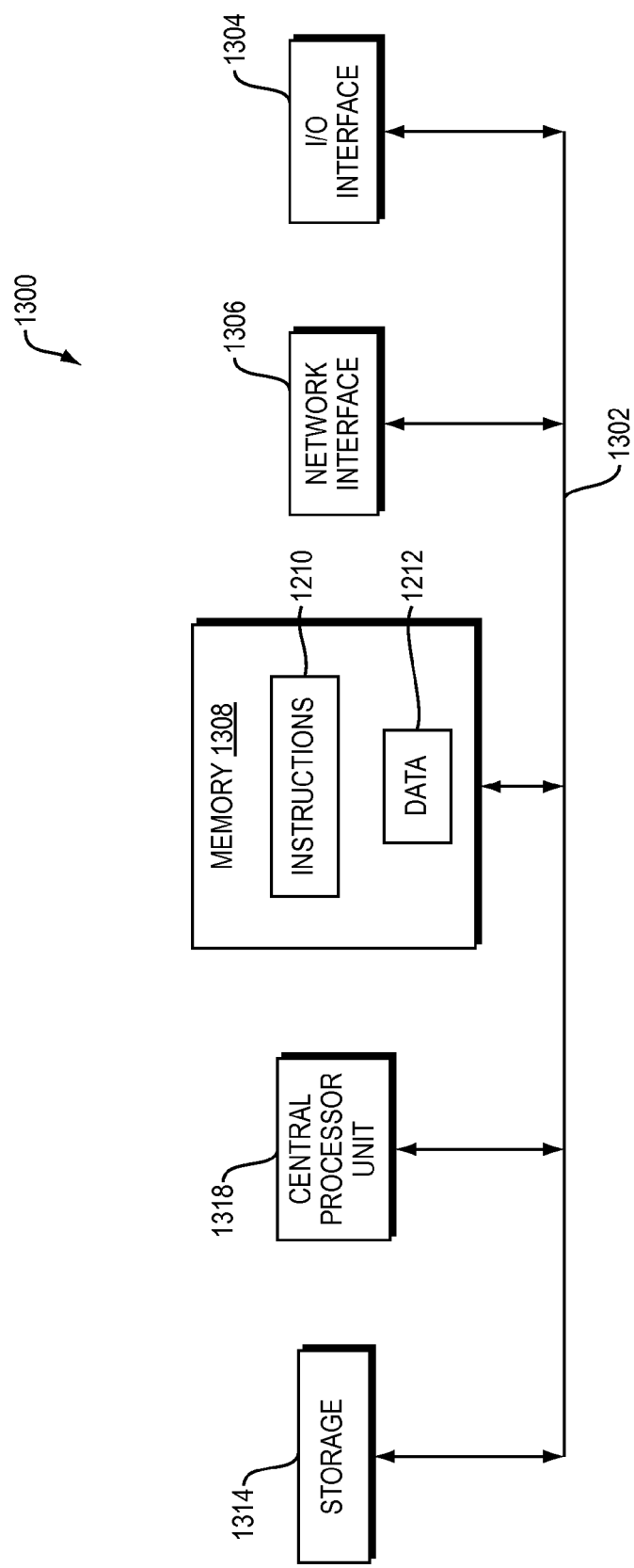
FIG. 13 is a block diagram of the internal structure of a computer.

FIG. 13 is a block diagram of the internal structure of a computer 1300 in which various embodiments of the present invention may be implemented. The computer 1300 contains system bus 1302, where a bus is a set of hardware lines used for data transfer among the components of a computer or processing system. Bus 1302 is essentially a shared conduit that connects different elements of a computer system (e.g., processor, disk storage, memory, input/output ports, network ports, etc.) that enables the transfer of information between the elements. Coupled to system bus 1302 is I/O device interface 1304 for connecting various input and output devices (e.g., keyboard, mouse, displays, printers, speakers, etc.) to the computer 1300. Network interface 1306 allows the computer 1300 to connect to various other devices attached to a network. Memory 1308 provides volatile storage for computer software instructions 1310 and data 1312 may be used to implement embodiments of the present invention. Disk storage 1314 provides non-volatile storage for computer software instructions 1310 and data 1312 that may be used to implement embodiments of the present invention. Central processor unit 1318 is also coupled to system bus 1302 and provides for the execution of computer instructions.

Processor instructions 1310 and data 1312 may be a computer program product, including a computer readable medium (e.g., a removable storage medium, such as one or more DVD-ROM's, CD-ROM's, diskettes, tapes, etc.) that provides at least a portion of the software instructions for embodiments discussed herein. The computer program product can be installed by any suitable software installation procedure, as is well known in the art. Alternatively, at least a portion of the software instructions may also be downloaded over a cable, communication and/or wireless connection.

Figure 14B:
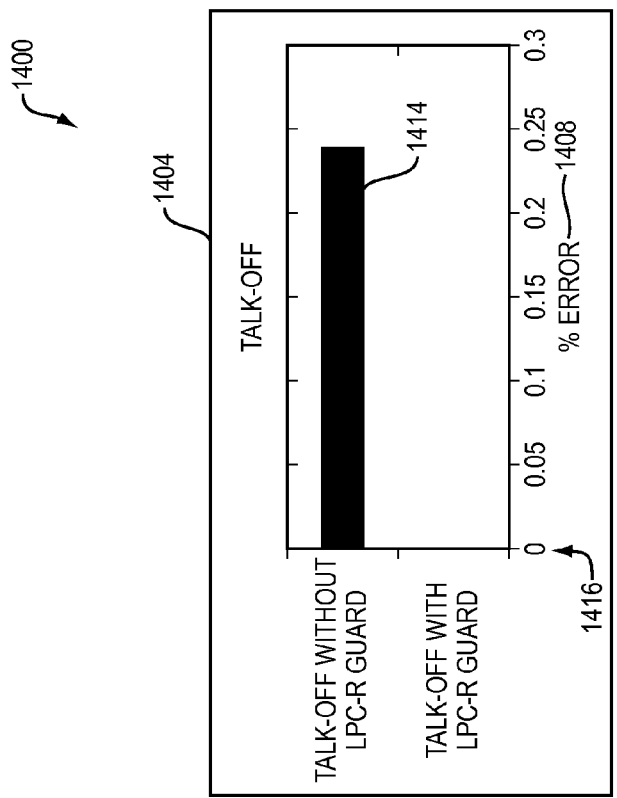
FIGS. 14A-B are graphs of experimental performance data captured for Dual-Tone Multi-Frequency (DTMF) tone detection.
Figure 14A:
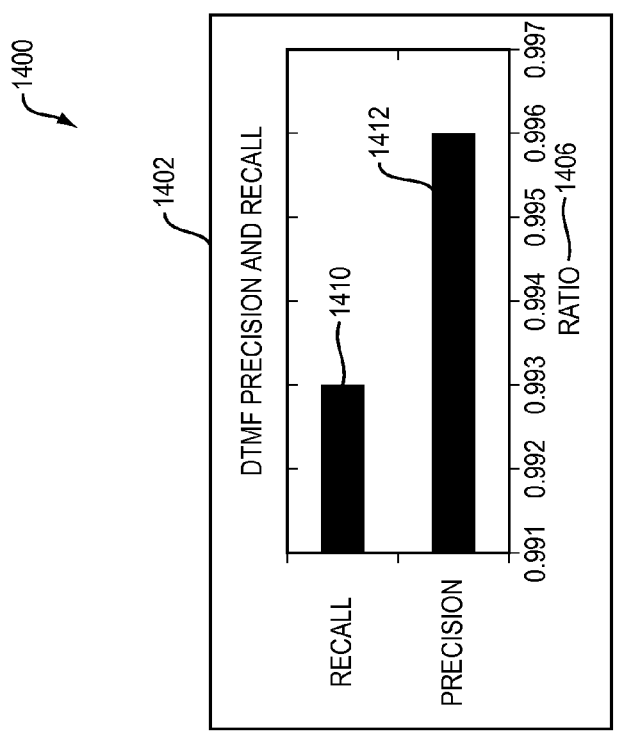

FIGS. 14A-B are graphs of experimental performance data captured for Dual-Tone Multi-Frequency (DTMF) tone detection. The experiments were conducted using a speech server that implemented both speech processing and tone detection.

FIG. 14A illustrates DTMF precision and recall performance data captured for a speech server (1402). The precision (1412) is an illustration of the number of correct findings for a total number of observations. The recall (1410) is an illustration of a total number of correct findings for a total number of possible correct findings. The ratio (1406) is shown, where a perfect performance for detecting DTMF tones is 1.0 (not shown).

FIG. 14B illustrates DTMF performance with respect to talk-off (1404). The performance for detecting DTMF when Linear Predictive Coding Residual analysis (LPC-R) is not applied (1414) is shown, where 1408 illustrates an error percentage. The performance for detecting DTMF when Linear Predictive Coding Residual analysis (LPC-R) is applied reflects a negligible error percentage (1416).

Figures 15A, 15B:
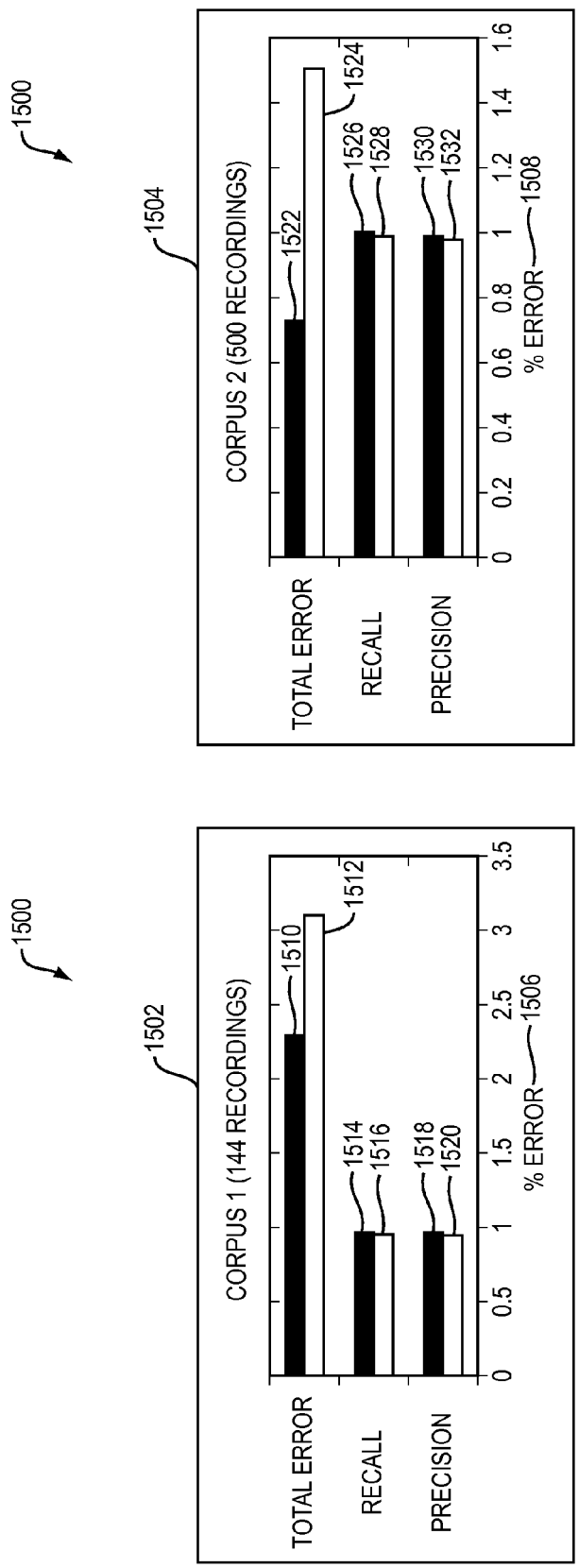
FIGS. 15A-B are graphs of experimental performance data captured for Answering Machine Device (AMD) detection.

FIGS. 15A-B are graphs of experimental performance data captured for Answering Machine Device (AMD) detection. The experiments were conducted using a speech server that implemented both speech processing and tone detection.

FIG. 15A illustrates Answering Machine Device (AMD) detection performance data captured for detecting Corpus 1 (144 recordings) (1502). The total error (1510), recall (1514), and precision are shown for when no timing constraint is used. The total error (1512), recall (1514), and precision (1518) performance values are shown for when an end-of-greeting timing constraint is used. No timing constraint performance is an indication of whether or not a decision was made that an answering machine device was detected and whether or not the decision was correct. The end-of-greeting timing constraint performance is based on whether or not a notification of the end-of-greeting was sent within, for example, 200 msec of the end-of-greeting finishing.

FIG. 15B illustrates Answering Machine Device (AMD) detection performance captured for detecting Corpus 2 (500 recordings) (1504). The total error (1522), recall (1526), and precision (1530) data captured are shown for when no timing constraint is used. The total error (1524), recall (1528), and precision (1532) performance values captured are shown for when an end-of-greeting timing constraint is used. No timing constraint performance is an indication of whether or not a decision was made that an answering machine device was detected and whether or not the decision was correct. The end-of-greeting timing constraint performance is based on whether or not a notification of the end-of-greeting was sent within, for example, 200 msec of the end-of-greeting finishing.

Figure 16:
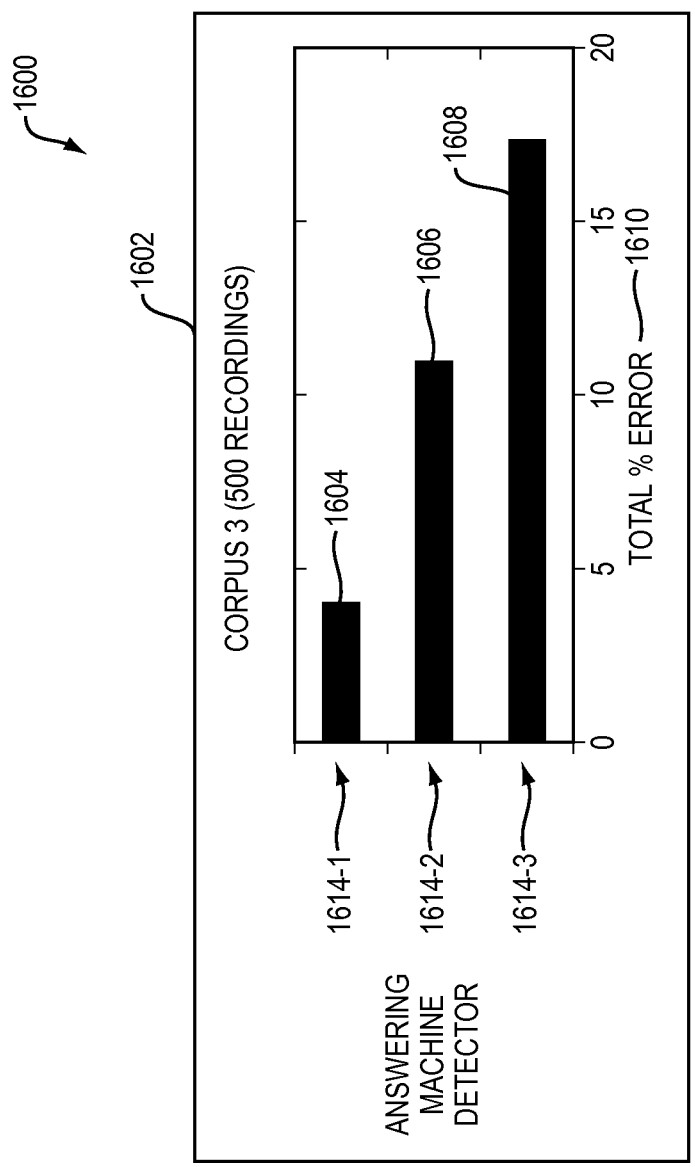
FIG. 16 is a comparison graph of experimental performance data captured for Answering Machine Device (AMD) detection.

FIG. 16 is a graph of performance data for Answering Machine Device (AMD) detection captured for detecting Corpus 3 (500 recordings) (1602). The total % error (1610) out of Corpus 3 is illustrated. The error rate captured (1604) for a speech server that employed techniques as disclosed herein (1614-1). The speech server included a tones library and speech components (1614-1) that interfaced with a gateway that passed both speech and tones in the audio stream to the speech server (1614-1) is shown (1604). The Answering Machine Device (AMD) detection was implemented in the speech server that employed (1614-1).

The error rate captured (1606) for a system that did not include tone detection components in a speech server (1614-2) is shown (1606). The system 1614-2 did not employ techniques as disclosed herein. The system 1614-2 interfaced with a gateway that passed speech in the audio stream to a speech server that did not include tone detection. The Answering Machine Device (AMD) detection was implemented based on timeouts in a voice browser. The timeouts in 1614-2 were optimized for the test set (1614-2).

The error rate captured (1608) for a system that did not include tone detection components in a speech server (1614-3) is shown (1608). The system 1614-3 did not employ techniques as disclosed herein. The system 1614-3 interfaced with a gateway that passed speech in the audio stream to a speech server that did not include tone detection. The Answering Machine Device (AMD) detection was implemented based on timeouts in a voice browser. The timeouts in 1614-3 were set to their default settings.

Embodiments of the present invention may be implemented in a variety of computer architectures. The general computer of FIG. 13 is for purposes of illustration and not limitation of any embodiments of the present invention.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transitory machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the block diagrams may include more or fewer elements, be arranged differently, or be represented differently. It should be understood that implementation may dictate the block and flow diagrams and the number of block and flow diagrams illustrating the execution of embodiments of the invention.

Although embodiments disclosed herein may be described as being implemented within a speech server, it should be understood the embodiments could be implemented in any suitable machine or apparatus, such as general purpose computers, Application Specific Integrated Circuits (ASICs), Field Programmable Gate Arrays (FPGAs) or any communication or network device communicating in a network such as a telephony network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "unit," "module," or "system."

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
    disambiguating speech from tones in an audio stream by a plurality of tone detection modules in a speech server by performing an analysis on the audio stream received and detecting tones at the plurality of tone detection modules based on the analysis;
    broadcasting tone events to at least one of the plurality of tone detection modules, at least one or more of the at least one of the plurality of tone detection modules resetting a respective analysis of the audio stream by detecting a tone event broadcast;
    triggering a series of one or more tone observation notifications based on a series of one or more tone events broadcast by the at least one of the plurality of tone detection modules.

2. The method of claim 1, wherein triggering the series of the one or more tone observation notifications by the speech server includes announcing detection of an Answering Machine Device (AMD) and announcing detection of an end of an AMD greeting message using Session Initiation Protocol (SIP) information messages containing a text payload describing one or more tone observations.

3. The method of claim 2, further comprising delaying announcing detection of an end of the Answering Machine Device (AMD) greeting message by the speech server by detecting an initial ringback tone event broadcast to indicate a potential onset of a ringback tone.

4. The method of claim 1, wherein detecting the tone event broadcast includes detecting a ringback tone event broadcast.

5. The method of claim 1, wherein the plurality of tone detection modules includes a first subset and a second subset, the first subset being a set of universal tone detection modules and the second subset being a set of regional tone detection modules, the method of claim 1 further comprising extending a set of universal and regional tones being detected by updating an Extensible Markup Language (XML) document.

6. The method of claim 5, further comprising detecting universal tones at the first subset of tone detection modules and regional tones at the second subset of tone detection modules, wherein:
    the universal tones include Dual-Tone Multi-Frequency (DTMF) tones or Answering Machine Device (AMD) tones; and
    the regional tones include Special Information Tones (SIT) or ringback tones.

7. The method of claim 6, wherein analysis on the audio stream received at the DTMF tone detector includes applying Linear Predictive Coding Residual analysis (LPC-R), Goertzel filters, or a Fast Fourier Transform.

8. The method of claim 6, wherein analysis on the audio stream received at the Answering Machine Device (AMD) tone detector includes applying a Fast Fourier Transform (FFT), Linear Predictive Coding Residual analysis (LPC-R), or Goertzel filters.

9. The method of claim 5, further comprising detecting TDD, TTY or FAX tones at the first subset of tone detection modules.

10. The method of claim 5, wherein triggering the series of the one or more tone observation notifications by the speech server is based on tone events broadcast from the at least one of the plurality of tone detection modules including at least one of the set of universal tone detection modules and at least one of the set of regional tone detection modules.

11. The method of claim 1, further comprising:
    coupling the plurality of tone detection modules to a control bus and a signal bus, wherein tone events are broadcast on the signal bus;
    coupling an observation module to the control bus and the signal bus;
    demarcating tones detected by the plurality of tone detection modules as one of terminal or suppressed; and
    controlling a tone detection function of the plurality of tone detection modules by the observation module based on the tone event broadcast and a corresponding demarcation of the tone detected, wherein the tone detection function is controlled based on signaling on the control bus.

12. The method of claim 11, further comprising disarming hunting for the tone in the tone detection function, wherein hunting is disarmed if the corresponding demarcation of the tone is terminal or specifically where the tone type is expected within an initial observation window commencing with the start of a call and a given amount of time has elapsed since the beginning of the call, and propagating the tone detection event to one or more of the plurality of tone detection modules with the corresponding demarcation of the tone suppressed.

13. The method of claim 1, further comprising:
providing a configuration file with configurations for the plurality of tone detection modules on a per-customer per-application basis; and
enabling overriding of at least one active configuration by toggling the active configuration based on a specified customer and application or by opening the configuration file and configuring at least one active tone detector module based on the tone definitions specified by the file, wherein the file is an Extensible Markup Language (XML) file.

14. A speech server comprising:
a plurality of tone detection modules configured to disambiguate speech from tones in an audio stream received by performing an analysis on the audio stream received and configured to detect tones based on the analysis and to broadcast tone events to at least one of the plurality of tone detection modules based on the tones detected, at least one or more of the at least one of the plurality of tone detection modules configured to reset a respective analysis of the audio stream responsive to detecting a tone event broadcast; and
an observation module configured to trigger a series of tone observation notifications based on the series of one or more tone events broadcast by the at least one of the plurality of tone detection modules.

15. The speech server of claim 14, wherein the plurality of tone detection modules includes a first subset of tone detection modules and a second subset of tone detection modules, the first subset configured to detect a set of universal tones or notifications and the second subset configured to detect a set of regional tones or notifications.

16. The speech server of claim 15, wherein the universal tones include Dual-Tone Multi-Frequency (DTMF) tones or Answering Machine Detection (AMD) tones and the regional tones include Special Information Tones (SIT) or ringback tones.

17. The speech server of claim 14, wherein the observation module is further configured to announce detection of an Answering Machine Device (AMD) and announce detection of an end of an AMD greeting message using Session Initiation Protocol (SIP) information messages containing a text payload describing one or more tone observations.

18. The speech server of claim 17, wherein the observation module is further configured to delay announcing detection of an end of the Answering Machine Device (AMD) greeting message by the speech server by detecting an initial ringback tone event broadcast to indicate a potential onset of a ringback tone.

19. The speech server of claim 14, wherein the at least one or more of the at least one of the plurality of tone detection modules is configured to reset the analysis on the audio stream received responsive to detecting a ringback tone event broadcast.

20. A non-transitory computer-readable medium having encoded thereon a sequence of instructions which, when executed by a processor, causes the processor to:
disambiguate speech from tones in an audio stream by a plurality of tone detection modules in a speech server by performing an analysis on the audio stream received and detecting tones at the plurality of tone detection modules based on the analysis; and
broadcast tone events to at least one of the plurality of tone detection modules, at least one or more of the at least one of the plurality of tone detection modules configured to reset a respective analysis of the audio stream responsive to detecting a tone event broadcast; and
trigger a series of one or more tone observation notifications based on a series of tone events broadcast by the at least one of the plurality of tone detection modules.

* * * * *